US008347345B1

(12) United States Patent
Hendricks et al.

(10) Patent No.: US 8,347,345 B1
(45) Date of Patent: Jan. 1, 2013

(54) TELEVISION TERMINAL MODEM

(75) Inventors: John S. Hendricks, Potomac, MD (US);
Alfred E. Bonner, Bethesda, MD (US);
Richard E. Wunderlich, Alpharetta, GA
(US); Eric C. Berkobin, Woodstock, GA
(US)

(73) Assignee: Cox Communications, Inc., Atlanta, GA (US)

(*) Notice: Subject to any disclaimer, the term of this patent is extended or adjusted under 35 U.S.C. 154(b) by 0 days.

(21) Appl. No.: 09/396,429

(22) Filed: Sep. 15, 1999

Related U.S. Application Data

(60) Division of application No. 08/160,194, filed on Dec. 2, 1993, now Pat. No. 5,990,927, which is a continuation-in-part of application No. 07/991,074, filed on Dec. 9, 1992, now abandoned.

(51) Int. Cl.
*H04N 7/16* (2011.01)
*H04N 7/173* (2011.01)
*G06F 3/00* (2006.01)
*G06F 13/00* (2006.01)
*H04N 5/445* (2011.01)

(52) U.S. Cl. ............ 725/132; 725/50; 725/51; 725/110; 725/131; 725/133; 725/134; 725/139; 725/140; 725/141; 725/142; 725/151; 725/152; 725/153

(58) Field of Classification Search .......... 725/131–134, 725/139–142, 151–153, 100, 89, 85, 68–72, 725/49, 14–20; 348/552; *H04N 7/16, 7/173*
See application file for complete search history.

(56) References Cited

U.S. PATENT DOCUMENTS

| | | | |
|---|---|---|---|
| 3,891,792 A | 6/1975 | Kimura | |
| 4,361,848 A | 11/1982 | Poignet et al. | |
| 4,381,522 A | 4/1983 | Lambert | |
| 4,398,216 A | 8/1983 | Field et al. | |
| 4,451,701 A | 5/1984 | Bendig | |
| 4,455,570 A | 6/1984 | Saeki et al. | |
| 4,484,217 A | 11/1984 | Block et al. | |
| 4,488,179 A | 12/1984 | Kruger et al. | |
| 4,517,598 A | 5/1985 | Van Valkenburg et al. | |
| 4,528,643 A | 7/1985 | Freeny, Jr. | |
| 4,587,520 A | 5/1986 | Astle | |
| 4,605,964 A | 8/1986 | Chard | |

(Continued)

FOREIGN PATENT DOCUMENTS

CA 2044574 12/1992
(Continued)

OTHER PUBLICATIONS

U.S. Appl. No. 09/396,428, filed Sep. 15, 1999 entitled "Television Terminal Data Storage".

(Continued)

*Primary Examiner* — Dominic D Saltarelli
(74) *Attorney, Agent, or Firm* — Merchant & Gould

(57) ABSTRACT

The invention relates to apparatus and methods for a television terminal with a modem. The television terminal may be a set top terminal for use with a cable television program delivery system. The modem may be integral to the terminal or may be provided as a hardware upgrade unit or expansion card connected to the terminal to modularly enhance the functionality of the terminal. The modem enables the terminal to communicate with interactive services and on-line databases, including services and databases outside of the television program delivery system. The services and databases may provide home shopping, airline reservations, news, financial information, classified advertisements, home banking, and/or interactive teletext.

19 Claims, 20 Drawing Sheets

U.S. PATENT DOCUMENTS

| | | | |
|---|---|---|---|
| 4,621,282 A | 11/1986 | Ahern | |
| 4,633,462 A | 12/1986 | Stifle et al. | |
| 4,639,225 A | 1/1987 | Washizuka | |
| 4,688,218 A | 8/1987 | Blineau et al. | |
| 4,688,246 A | 8/1987 | Eilers et al. | |
| 4,691,340 A | 9/1987 | Maeda et al. | |
| 4,694,490 A | 9/1987 | Harvey et al. | |
| 4,697,209 A | 9/1987 | Kiewit et al. | |
| 4,706,121 A | 11/1987 | Young | |
| 4,712,105 A | 12/1987 | Kohler | |
| 4,712,130 A | 12/1987 | Casey | |
| 4,724,491 A | 2/1988 | Lambert | |
| 4,747,785 A * | 5/1988 | Roberts et al. | 439/88 |
| 4,751,578 A * | 6/1988 | Reiter et al. | 348/564 |
| 4,792,972 A | 12/1988 | Cook, Jr. | |
| 4,805,014 A | 2/1989 | Sahara et al. | |
| 4,816,901 A | 3/1989 | Music et al. | |
| D301,037 S | 5/1989 | Matsuda | |
| 4,829,558 A | 5/1989 | Welsh | |
| 4,829,569 A | 5/1989 | Seth-Smith et al. | |
| 4,855,725 A | 8/1989 | Fernandez | |
| 4,860,379 A | 8/1989 | Schoeneberger et al. | |
| 4,876,736 A | 10/1989 | Kiewit | |
| 4,890,319 A | 12/1989 | Seth-Smith et al. | |
| 4,920,339 A | 4/1990 | Friend et al. | |
| 4,924,303 A | 5/1990 | Brandon et al. | |
| 4,928,168 A | 5/1990 | Iwashita | |
| 4,935,924 A | 6/1990 | Baxter | |
| 4,947,429 A | 8/1990 | Bestler et al. | |
| 4,949,187 A | 8/1990 | Cohen | |
| 4,959,810 A | 9/1990 | Darbee et al. | |
| 4,961,109 A | 10/1990 | Tanaka | |
| 4,965,825 A | 10/1990 | Harvey et al. | |
| 4,974,252 A | 11/1990 | Osborne | |
| 4,975,951 A | 12/1990 | Bennett | |
| 4,977,455 A | 12/1990 | Young | |
| D314,383 S | 2/1991 | Hafner | |
| 4,994,908 A | 2/1991 | Kuban et al. | |
| 4,995,078 A | 2/1991 | Monslow et al. | 380/240 |
| 4,996,597 A | 2/1991 | Duffield | |
| 5,001,554 A | 3/1991 | Johnson et al. | |
| 5,014,125 A | 5/1991 | Pocock et al. | |
| 5,015,829 A | 5/1991 | Eilert et al. | |
| 5,020,129 A | 5/1991 | Martin et al. | |
| 5,027,400 A | 6/1991 | Baji et al. | |
| 5,036,394 A | 7/1991 | Morii et al. | |
| 5,036,537 A | 7/1991 | Jeffers et al. | |
| 5,038,402 A | 8/1991 | Robbins | |
| 5,046,093 A | 9/1991 | Wachob | |
| 5,047,867 A | 9/1991 | Strubbe et al. | |
| 5,049,990 A | 9/1991 | Kondo et al. | |
| 5,056,138 A | 10/1991 | Tyson, Sr. | |
| 5,057,917 A | 10/1991 | Shalkauser et al. | |
| 5,073,930 A | 12/1991 | Green et al. | |
| 5,075,771 A | 12/1991 | Hashimoto | |
| 5,077,607 A | 12/1991 | Johnson et al. | |
| 5,078,019 A | 1/1992 | Aoki | |
| 5,091,782 A | 2/1992 | Krause et al. | |
| 5,093,718 A | 3/1992 | Hoarty et al. | |
| D325,581 S | 4/1992 | Schwartz | |
| 5,103,314 A | 4/1992 | Keenan | |
| 5,105,268 A | 4/1992 | Yamanouchi et al. | |
| 5,130,792 A | 7/1992 | Tindell et al. | |
| 5,132,789 A | 7/1992 | Ammon et al. | |
| 5,132,992 A * | 7/1992 | Yurt et al. | 725/100 |
| 5,133,079 A | 7/1992 | Ballantyne et al. | |
| 5,134,712 A | 7/1992 | Yamamoto | |
| D329,238 S | 9/1992 | Grasso et al. | |
| 5,144,663 A | 9/1992 | Kudelski et al. | |
| 5,150,118 A | 9/1992 | Finkle et al. | |
| 5,151,782 A | 9/1992 | Ferraro | |
| 5,151,789 A | 9/1992 | Young | |
| 5,152,011 A | 9/1992 | Schwob | |
| 5,155,591 A | 10/1992 | Wachob | |
| 5,166,886 A | 11/1992 | Molnar et al. | |
| D331,760 S | 12/1992 | Renk, Jr. | |
| 5,172,413 A | 12/1992 | Bradley et al. | |
| 5,182,639 A | 1/1993 | Jutamulia et al. | |
| 5,192,999 A * | 3/1993 | Graczyk et al. | 348/552 |
| 5,195,022 A * | 3/1993 | Hoppal et al. | 361/685 |
| 5,202,817 A | 4/1993 | Koenck et al. | |
| 5,206,722 A | 4/1993 | Kwan | |
| 5,206,954 A | 4/1993 | Inoue et al. | |
| 5,212,553 A | 5/1993 | Maruoka | |
| 5,216,515 A | 6/1993 | Steele et al. | |
| 5,223,924 A | 6/1993 | Strubbe | |
| 5,231,494 A * | 7/1993 | Wachob | 348/385.1 |
| 5,237,311 A | 8/1993 | Mailey et al. | |
| 5,237,610 A | 8/1993 | Gammie et al. | |
| 5,247,347 A | 9/1993 | Litteral et al. | |
| 5,247,364 A | 9/1993 | Banker et al. | |
| 5,247,575 A * | 9/1993 | Sprague et al. | 725/53 |
| 5,251,909 A * | 10/1993 | Reed et al. | 463/29 |
| 5,253,066 A * | 10/1993 | Vogel | 725/88 |
| 5,253,275 A | 10/1993 | Yurt et al. | |
| 5,253,341 A | 10/1993 | Rozmanith et al. | |
| 5,260,778 A | 11/1993 | Kauffman et al. | |
| 5,270,809 A | 12/1993 | Gammie et al. | |
| 5,282,028 A | 1/1994 | Johnson et al. | |
| 5,283,639 A * | 2/1994 | Esch et al. | 725/32 |
| 5,285,272 A | 2/1994 | Bradley et al. | |
| 5,289,271 A | 2/1994 | Watson | |
| 5,293,540 A | 3/1994 | Trani et al. | |
| 5,293,633 A | 3/1994 | Robbins | |
| 5,307,481 A | 4/1994 | Shimazaki et al. | |
| 5,311,325 A | 5/1994 | Edwards et al. | |
| 5,311,425 A | 5/1994 | Inada | |
| 5,319,455 A | 6/1994 | Hoarty et al. | |
| 5,319,707 A | 6/1994 | Wasilewski et al. | |
| 5,321,840 A * | 6/1994 | Ahlin et al. | 717/178 |
| 5,323,240 A | 6/1994 | Amano et al. | |
| 5,327,554 A * | 7/1994 | Palazzi, III et al. | 725/110 |
| 5,329,590 A * | 7/1994 | Pond | 380/242 |
| 5,339,315 A | 8/1994 | Maeda et al. | |
| 5,341,166 A | 8/1994 | Garr et al. | |
| 5,341,474 A | 8/1994 | Gelman et al. | |
| 5,343,239 A | 8/1994 | Lappington et al. | |
| 5,343,516 A | 8/1994 | Callele et al. | |
| 5,345,594 A | 9/1994 | Tsuda | |
| 5,347,304 A * | 9/1994 | Moura et al. | 725/131 |
| 5,349,638 A | 9/1994 | Pitroda et al. | |
| 5,351,075 A | 9/1994 | Herz et al. | |
| 5,353,121 A | 10/1994 | Young et al. | |
| 5,355,162 A | 10/1994 | Yazolino et al. | |
| 5,357,276 A * | 10/1994 | Banker et al. | 725/102 |
| 5,359,601 A | 10/1994 | Wasilewski et al. | |
| 5,365,265 A | 11/1994 | Shibata et al. | |
| 5,367,571 A * | 11/1994 | Bowen et al. | 380/242 |
| 5,375,068 A | 12/1994 | Palmer et al. | |
| 5,383,044 A | 1/1995 | Borchardt et al. | |
| 5,390,348 A | 2/1995 | Magin et al. | |
| 5,396,546 A * | 3/1995 | Remillard | 348/552 |
| 5,400,401 A | 3/1995 | Wasilewski et al. | |
| 5,404,393 A | 4/1995 | Remillard | |
| 5,404,505 A | 4/1995 | Levinson | |
| 5,410,326 A | 4/1995 | Goldstein | |
| 5,410,344 A | 4/1995 | Graves et al. | |
| 5,412,416 A | 5/1995 | Nemirofsky | |
| 5,412,720 A | 5/1995 | Hoarty | |
| 5,414,426 A | 5/1995 | O'Donnell et al. | |
| 5,414,455 A | 5/1995 | Hooper et al. | |
| 5,416,508 A | 5/1995 | Sakuma et al. | |
| 5,421,031 A * | 5/1995 | De Bey | 725/92 |
| 5,424,770 A | 6/1995 | Schmelzer et al. | |
| 5,428,372 A | 6/1995 | Akiyama et al. | |
| 5,432,542 A | 7/1995 | Thibadeau et al. | |
| 5,437,052 A * | 7/1995 | Hemmie et al. | 725/73 |
| 5,438,372 A | 8/1995 | Tsumori et al. | |
| 5,440,632 A * | 8/1995 | Bacon et al. | 380/242 |
| 5,442,626 A | 8/1995 | Wei | |
| 5,446,919 A | 8/1995 | Wilkins | |
| 5,461,667 A | 10/1995 | Remillard | |
| 5,469,206 A | 11/1995 | Strubbe et al. | |
| 5,469,431 A | 11/1995 | Wendorf et al. | |
| 5,473,362 A | 12/1995 | Fitzgerald et al. | |
| 5,477,262 A | 12/1995 | Banker et al. | 725/38 |
| 5,477,263 A | 12/1995 | O'Callaghan et al. | |

| | | | |
|---|---|---|---|
| 5,479,268 A | 12/1995 | Young et al. | |
| 5,481,294 A | 1/1996 | Thomas et al. | |
| 5,481,296 A | 1/1996 | Cragun et al. | |
| 5,481,542 A | 1/1996 | Logston et al. | |
| 5,483,277 A * | 1/1996 | Granger | 725/120 |
| 5,483,278 A | 1/1996 | Strubbe et al. | |
| 5,500,794 A | 3/1996 | Fujita et al. | |
| 5,508,733 A | 4/1996 | Kassatly | 725/93 |
| 5,512,934 A | 4/1996 | Kochanski | 725/97 |
| 5,515,098 A | 5/1996 | Carles | |
| 5,526,034 A * | 6/1996 | Hoarty et al. | 725/138 |
| 5,550,863 A | 8/1996 | Yurt et al. | |
| 5,559,549 A | 9/1996 | Hendricks et al. | |
| 5,561,708 A | 10/1996 | Remillard | |
| 5,561,709 A | 10/1996 | Remillard | |
| 5,570,126 A | 10/1996 | Blahut et al. | |
| 5,579,055 A | 11/1996 | Hamilton et al. | |
| 5,583,560 A * | 12/1996 | Florin et al. | 725/40 |
| 5,600,364 A | 2/1997 | Hendricks et al. | |
| 5,600,368 A | 2/1997 | Matthews, III | 348/143 |
| 5,621,456 A | 4/1997 | Florin et al. | |
| 5,638,426 A | 6/1997 | Lewis | |
| 5,644,354 A | 7/1997 | Thompson et al. | |
| 5,659,350 A | 8/1997 | Hendricks et al. | |
| 5,661,516 A | 8/1997 | Carles | |
| 5,663,757 A | 9/1997 | Morales | |
| 5,682,195 A | 10/1997 | Hendricks et al. | |
| 5,696,906 A | 12/1997 | Peters et al. | |
| 5,724,091 A | 3/1998 | Freeman et al. | |
| 5,734,853 A | 3/1998 | Hendricks et al. | |
| 5,758,257 A | 5/1998 | Herz et al. | 725/116 |
| 5,791,569 A | 8/1998 | Ishikawa | |
| 5,798,785 A | 8/1998 | Hendricks et al. | |
| 5,844,600 A | 12/1998 | Kerr | |
| 5,917,537 A | 6/1999 | Lightfoot et al. | |
| 5,917,915 A | 6/1999 | Hirose | |
| 5,986,690 A | 11/1999 | Hendricks | |
| 5,990,927 A * | 11/1999 | Hendricks et al. | 725/132 |
| 6,119,154 A | 9/2000 | Weaver et al. | |
| 6,166,778 A | 12/2000 | Yamamoto et al. | |
| 6,331,877 B1 | 12/2001 | Bennington et al. | |
| 6,408,437 B1 | 6/2002 | Hendricks et al. | |
| 6,515,680 B1 | 2/2003 | Hendricks et al. | |
| 7,013,478 B1 | 3/2006 | Hendricks et al. | |
| 7,260,829 B1 | 8/2007 | Hendricks et al. | |
| 7,293,279 B1 | 11/2007 | Asmussen | |
| 7,571,457 B1 | 8/2009 | Hendricks et al. | |
| 7,814,522 B2 | 10/2010 | Asmussen | |

FOREIGN PATENT DOCUMENTS

| | | |
|---|---|---|
| DE | 34 23 846 A1 | 1/1986 |
| DE | 39 35 294 A1 | 4/1991 |
| EP | 0 103 438 A1 | 3/1984 |
| EP | 0 145 063 A2 | 6/1985 |
| EP | 0 149 536 A2 | 7/1985 |
| EP | 0 158 548 A1 | 10/1985 |
| EP | 0 167 237 A2 | 1/1986 |
| EP | 0 187 961 A2 | 7/1986 |
| EP | 0 243 312 A2 | 10/1987 |
| EP | 0 281 293 A2 | 9/1988 |
| EP | 0 328 440 A1 | 8/1989 |
| EP | 0340643 | 8/1989 |
| EP | 0 355 697 A2 | 2/1990 |
| EP | 0 399 200 A2 | 11/1990 |
| EP | 0 402 809 A2 | 12/1990 |
| EP | 0 420 123 A2 | 4/1991 |
| EP | 0 424 648 A2 | 5/1991 |
| EP | 0 425 834 A2 | 5/1991 |
| EP | 0 450 841 A2 | 10/1991 |
| EP | 0 506 435 A2 | 9/1992 |
| EP | 0 513 553 A2 | 11/1992 |
| EP | 0 513 763 A2 | 11/1992 |
| EP | 0 570 785 A1 | 11/1993 |
| GB | 1 204 190 | 9/1970 |
| GB | 2 168 227 A | 6/1986 |
| GB | 2 177 873 A | 1/1987 |
| JP | 61-60150 | 3/1986 |
| JP | 62-24777 | 2/1987 |
| JP | 62-140134 | 6/1987 |
| JP | 64-86778 | 3/1989 |
| JP | 1-20454 | 4/1989 |
| JP | 1-130683 | 5/1989 |
| JP | 1-142918 | 6/1989 |
| JP | 3-114375 | 5/1991 |
| JP | 3-198119 | 8/1991 |
| JP | 4-233886 | 8/1992 |
| JP | 5-250106 | 9/1993 |
| TW | 238461 | 4/1992 |
| TW | 234223 | 11/1994 |
| TW | 235358 | 12/1994 |
| TW | 235359 | 12/1994 |
| TW | 236065 | 12/1994 |
| TW | 236744 | 12/1994 |
| WO | WO 86/01962 | 3/1986 |
| WO | WO 89/09528 | 10/1989 |
| WO | WO 89/12370 | 12/1989 |
| WO | WO 90/10988 | 9/1990 |
| WO | WO 91/00670 | 1/1991 |
| WO | WO 91/03112 | 3/1991 |
| WO | WO 92/11713 | 7/1992 |
| WO | WO 92/12599 | 7/1992 |
| WO | WO 92/17027 | 10/1992 |
| WO | WO 92/21206 | 11/1992 |
| WO | WO 93/22877 | 11/1993 |
| WO | WO 94/14282 | 6/1994 |
| WO | WO 94/16527 | 7/1994 |
| WO | WO 95/15649 | 6/1995 |
| WO | WO 98/53581 | 11/1998 |
| WO | WO 01/11874 A1 | 2/2001 |

OTHER PUBLICATIONS

U.S. Appl. No. 09/106,859, filed Jun. 30, 1998 entitled "Method and Apparatus for Providing Broadcast Data Services".
Reimer, "Memories in my Pocket," Feb. 1991.
Olshansky et al., "Subscriber Distribution Networks Using Compressed Digital Video," Nov. 1992.
Dinaro et al., "Markets and Products Overview," 1991.
Advertisement, "Hong Kong Enterprise," Nov. 1988.
Advertisement, "Great Presentations," 1987.
Advertisement, "Consumer Dist.," Fall/Winter 1992.
van den Boom, "Interactive Videotex . . . ", Nov.-Dec. 1986.
Moloney, "Digital Compression in Todays. . . ", Jun. 6, 1993.
Bestler, "Flexible Data Structures . . . ", Jun. 6, 1993.
Sharpless, "Subscription Teletext for Value Added Services," Aug. 1985.
Gelman et al., "A Store-and Forward . . . ", Jun. 21, 1991.
Hewlett Packard Co., "HP-41C Operating Manual," Dec. 1982.
Sorce, et al., "Human Factors in Telecommunications," Sep. 1990.

* cited by examiner

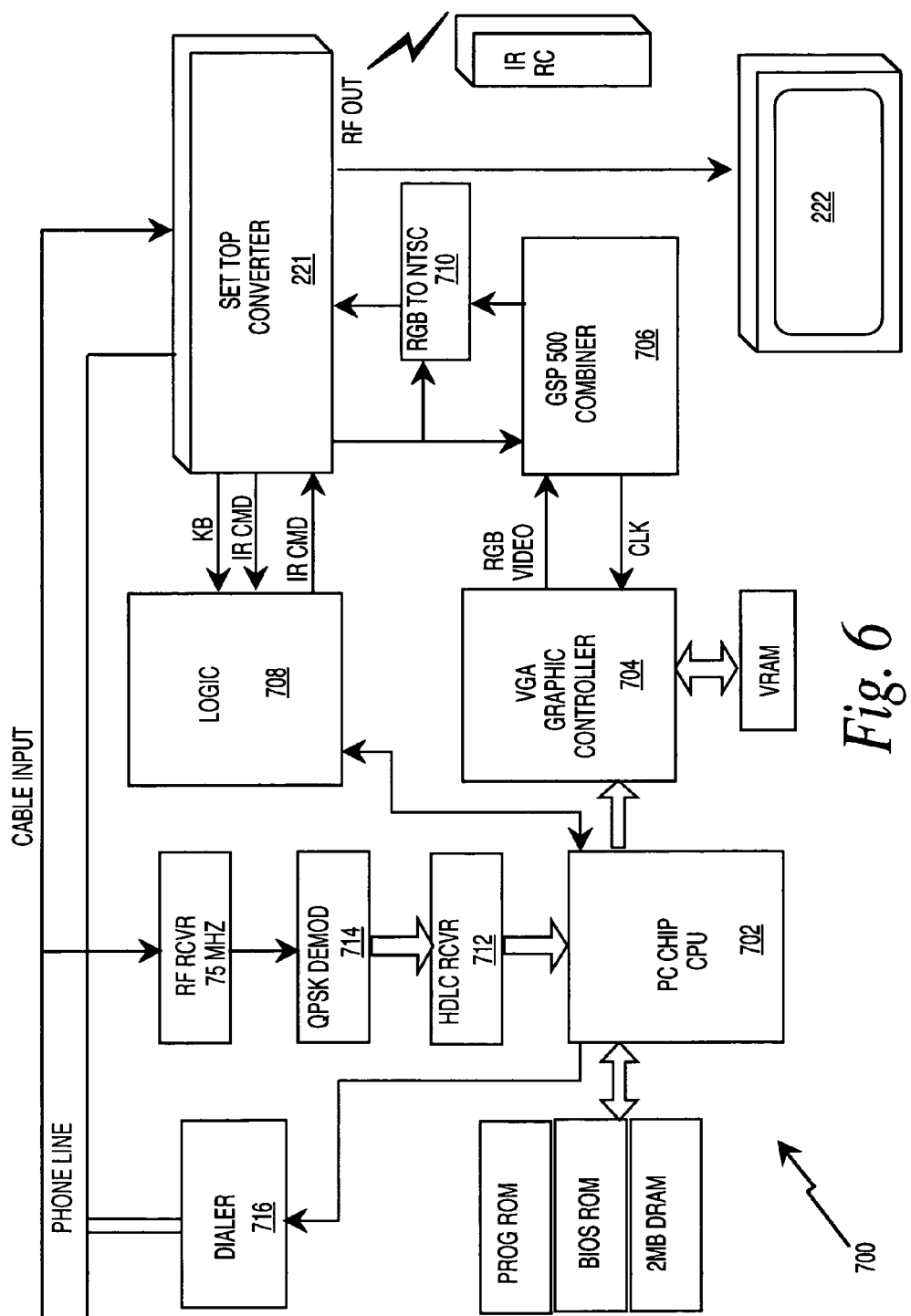

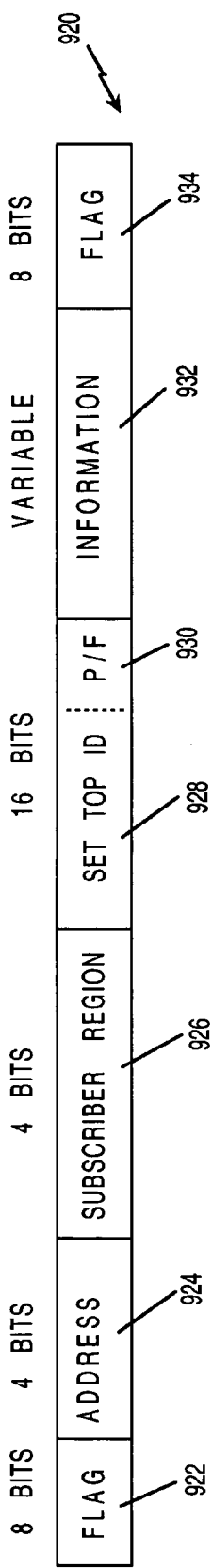
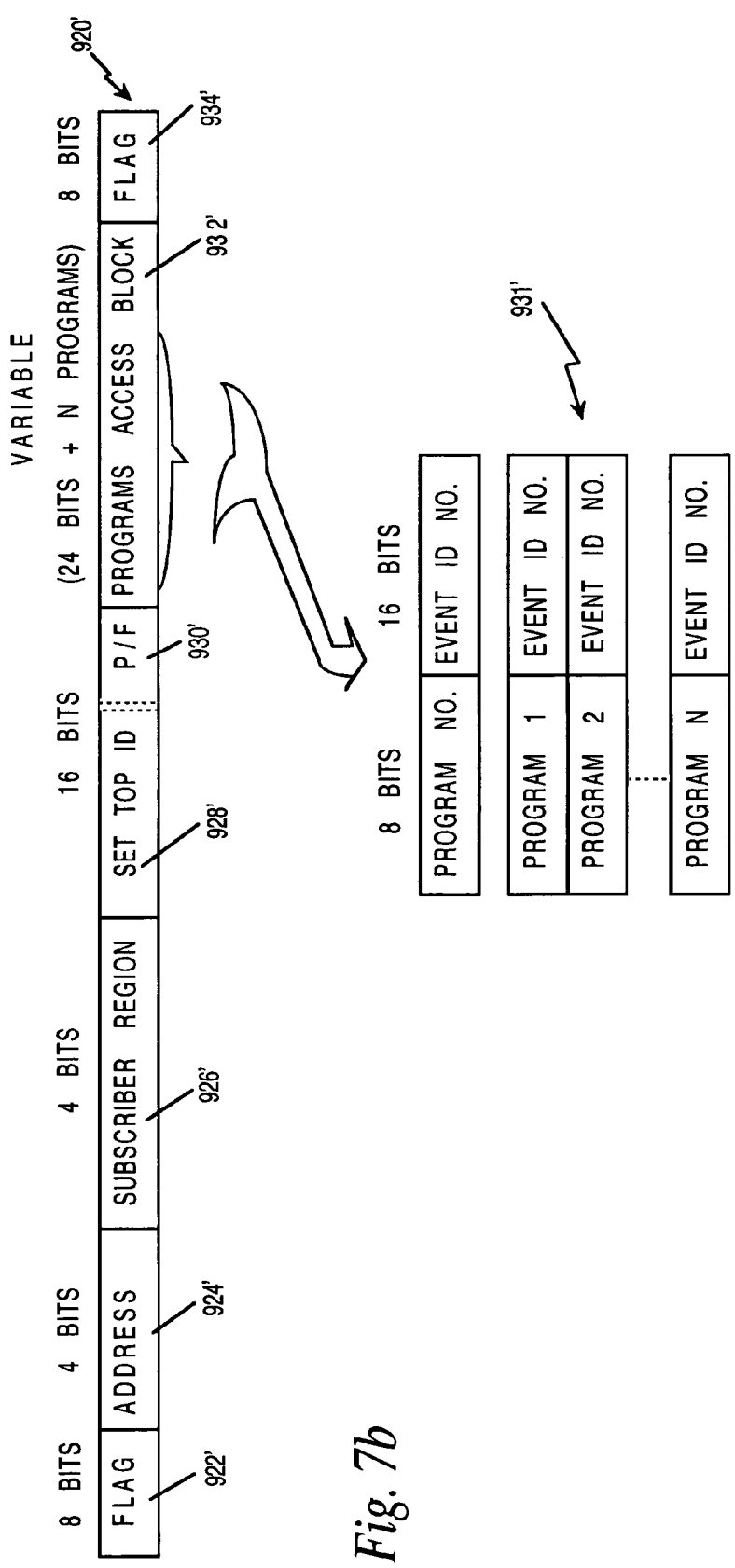
Fig. 7a
Fig. 7b

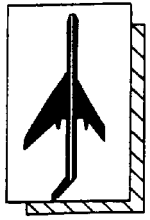
Fig. 15c

TELEVISION TERMINAL MODEM

RELATED APPLICATIONS

This application is a Divisional of application Ser. No. 08/160,194, filed Dec. 2, 1993, now U.S. Pat. No. 5,990,927 entitled ADVANCED SET TOP TERMINAL FOR CABLE TELEVISION DELIVERY SYSTEMS, and is a continuation-in part of application Ser. No. 07/991,074, filed Dec. 9 1992, entitled TELEVISION PROGRAM PACKAGING AND DELIVERY SYSTEM WITH MENU DRIVEN SUBSCRIBER ACCESS.

The following other related applications are continuation-in-part applications, also based on the above-referenced 07/991,074 patent application and filed on Dec. 2, 1993: Ser. No. 08/160,281, entitled REPROGRAMMABLE TERMINAL FOR SUGGESTING PROGRAMS OFFERED ON A TELEVISION PROGRAM DELIVERY SYSTEM, now U.S. Pat. No. 5,798,785; Ser. No. 08/160,280, entitled NETWORK CONTROLLER FOR CABLE TELEVISION DELIVERY SYSTEMS, now U.S. Pat. No. 5,600,364; Ser. No. 08/160,282, entitled AN OPERATIONS CENTER FOR A TELEVISION PROGRAM PACKAGING AND DELIVERY SYSTEM, now U.S. Pat. No. 5,659,350; Ser. No. 08/160,193, entitled SET TOP TERMINAL FOR CABLE TELEVISION DELIVERY SYSTEMS, now U.S. Pat. No. 5,734,853; Ser. No. 08/160,283, entitled DIGITAL CABLE HEADEND FOR CABLE TELEVISION DELIVERY SYSTEM, now U.S. Pat. No. 5,682,195; and Ser. No. 08/160,191, entitled TELEVISION PROGRAM DELIVERY SYSTEM, now U.S. Pat. No. 5,559,549.

All of the above listed patent applications and patents are hereby incorporated by reference.

TECHNICAL FIELD

The invention relates to television entertainment systems for providing television programming to consumer homes. More particularly, the invention relates to a terminal for use with a program delivery system. Even more particularly, the invention relates to a hardware upgrade providing a modem to such a terminal.

BACKGROUND OF THE INVENTION

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better useability, interfaces and service, the television entertainment industry will also experience a switch from new technology driving the market to consumer useability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels.

The concepts of interactive television, high definition television and 300 channel cable systems in consumer homes will not sell if they are not packaged, delivered and presented in a useable fashion to consumers. The problem is that TV programming is not being delivered and presented to consumers in a user friendly manner.

Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a unit per unit basis, such as the ordering of one program. Consumers prefer a unit sales approach because it keeps costs down and allows the consumer to be more selective in their viewing.

In addition, viewership fragmentation, which has already begun, will increase. Programming not presented in a user friendly manner will suffer with a decrease in viewership and revenue. As programming presentation becomes more user friendly, users seek additional features and functional capabilities.

What is needed is a set top converter with enhanced functionality.

What is needed is a set top converter that provides users with advanced features and capabilities.

What is needed is technology that upgrades the functionality of existing set top converters.

What is needed is hardware that provides an upgrade capability allowing the use of existing set top converter technology in advanced program delivery systems.

What is needed is a set top converter that provides an upstream communications capability between the set top converter and cable headend.

What is needed is a set top converter that provides a capability of generating menus for display.

What is needed is a set top converter that provides a simple way to select a program from a menu.

Certain embodiments of the present invention are capable of fulfilling these needs.

SUMMARY OF INVENTION

In one respect, the present invention is a hardware upgrade for a terminal for use with a television program delivery system. The hardware upgrade comprises an interface to the terminal and a modem connected to the interface. Optionally, the modem is capable of communicating with an interactive service or an on-line database, either of which may pertain to home shopping, airline reservations, news, financial information, classified advertisements, home banking, or the like.

In another aspect, the present invention is a terminal for use with a television program delivery system. The terminal comprises a receiver adapted to receive programs and a first hardware upgrade, which comprises an interface to the terminal and a modem connected to the interface. One or more additional hardware upgrades may be connected to the terminal, preferably in a daisy-chain arrangement, such as a SCSI daisy-chain.

In another aspect, the present invention is a system comprising a terminal and a television program delivery system adapted to deliver television program signals. The terminal comprises a receiver adapted to receive at least some of the television program signals and a hardware upgrade, which comprises an interface to the terminal and a modem connected to the interface. The system is preferably a cable television program delivery system.

In another aspect, the present invention is a television terminal comprising a television program receiver, a modem; and an output connected to the receiver and the modem, wherein the output accepts television program signals from the receiver and data signals from the modem. The output may be, for example, a video display.

In yet another aspect, the present invention is a method comprising the steps of receiving a television program, receiving subscriber input, communicating through a modem (including transmitting data based on the subscriber input and receiving data), and displaying the television program and/or information based on the received data. The received data may be information concerning the television program, quizzes, facts, geographical information, and product information. In response to the received data, digital data can be retrieved from a storage devices, such as a CD-ROM, for example.

Advantages of the invention will become obvious to those skilled in the art upon review of the following description, the attached drawings and appended claims.

DESCRIPTION OF THE DRAWINGS

FIG. 6 is a block diagram of a Turbo card upgrade for a set top terminal.

FIG. 7a is a drawing of a frame format for program control information signal.

FIG. 7b is a drawing of a frame format for a polling response from the set top terminal.

FIGS. 15a through 15d are drawings of interactive services using hardware upgrade Level B, which are related to on-screen airline reservations.

DETAILED DESCRIPTION OF A PREFERRED EMBODIMENT

A. Television Program Delivery System Description

1. Introduction

Figure 1:
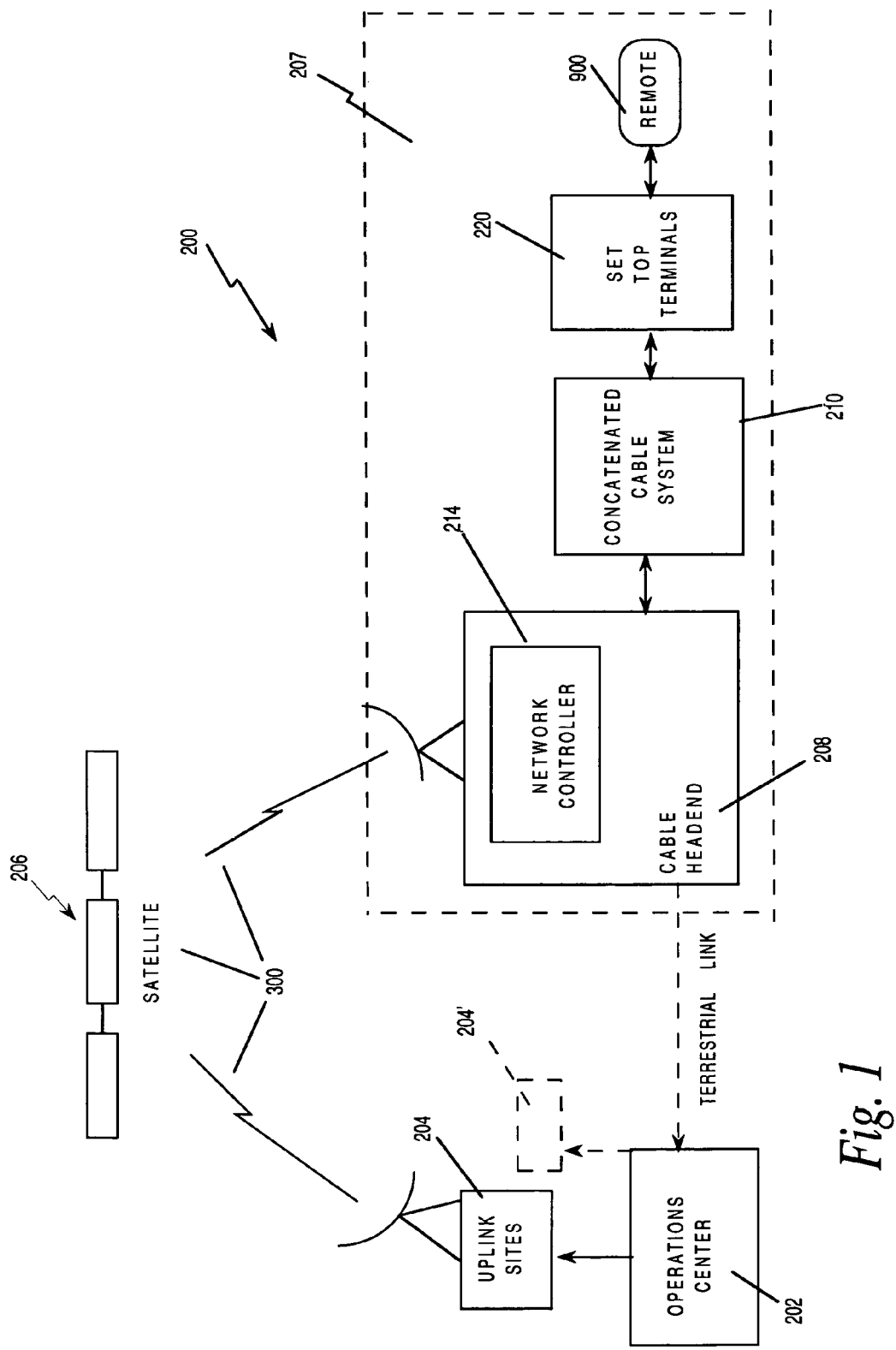
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu.

2. Major System Components

In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media to the home, telephone lines, cellular networks, fiber optics, Personal Communication Networks and similar technology for transmitting to the home can be used interchangeably with this program delivery system 200.

The delivery system 200 has a reception region 207 with an in-home decompression capability. This capability is performed by a decompressor housed within a set top terminal 220 in each subscriber's home. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Control signals are likewise extracted and decompressed and then either executed immediately or placed in local storage such as a RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

Figure 2:
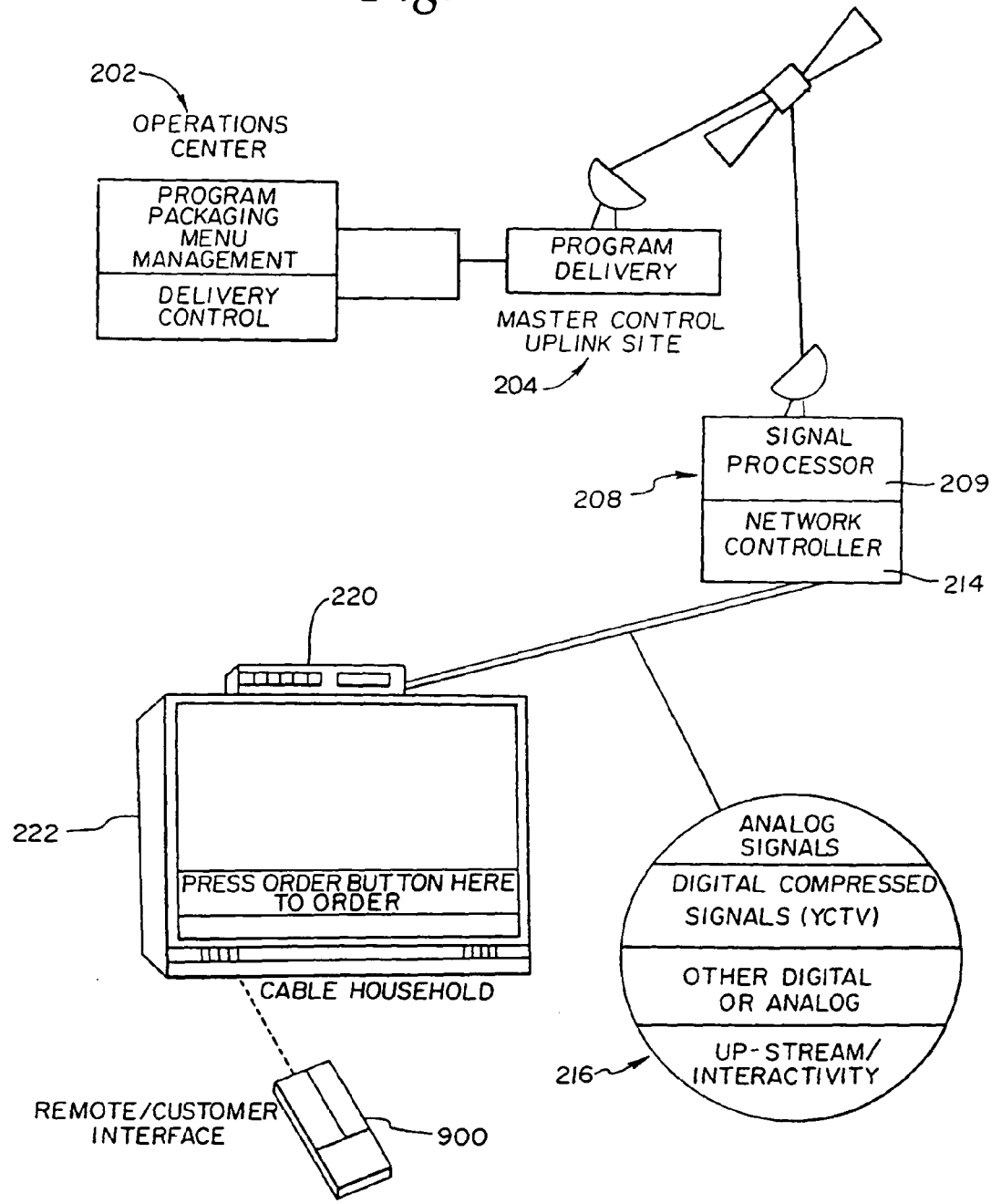
FIG. 2 is a schematic of the operation of the primary components of the system.

FIG. 2 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signalling capabilities in its dual roles as a signal processor 209 and network controller 214.

3. Set Top Terminal

The set top terminal 220 is the portion of the delivery system 200 that resides in the home of a subscriber. The set top terminal 220 is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as anti-taping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone jack which can be used for maintenance, trouble shooting, reprogramming and additional customer features. The set top terminal 220 may also contain stereo/audio output terminals and a satellite dish input port.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Also, optional upgrades are available to enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

4. Remote Control Device

The primary conduit for communication between the subscriber and the set top terminal 220 is through the subscriber interface, preferably a remote control device 900. Through this interface, the subscriber may select desired programming through the system's menu-driven scheme or by directly accessing a specific channel by entering the actual channel number. Using the interface, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the cable system 200, the physical characteristics of the subscriber interface 900 should also add to the user friendliness of the system. The remote control 900 should easily fit in the palm of the user's hand. The buttons of the preferred remote control 900 contain pictorial symbols that are easily identifiable by the subscriber. Also, buttons that perform similar functions may be color coordinated and consist of distinguishing textures to increase the user friendliness of the system.

5. Menu-Driven Program Selection

The menu-driven scheme provides the subscriber with one-step access to all major menus, ranging from hit movies to sport specials to specialty programs. From any of the major menus, the subscriber can in turn access submenus and minor menus by cursor or alpha-character access.

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Detailed Set Top Terminal Description

The set top terminal 220 receives and manipulates signals from the cable headend 208. The set top terminal 220 is equipped with local computer memory and the capability of interpreting the digitally compressed signal to produce menus for the subscriber. The remote control 900 communicates the subscriber's selections to the set top terminal 220. The subscriber's selections are generally based upon menus or other prompts displayed on the television screen.

It is preferred that the signal reaches the subscriber's home in a compressed format and is decompressed prior to viewing. Included in the delivered program signal is information that enables equipment at the subscriber's home to display menus for choosing particular programs. Depending on the particular embodiment, the television program signal may arrive at the subscriber's home through one or more connections such as coaxial cables, fiber cables, twisted pairs, cellular telephone connections, or personal communications network (PCN) hookups.

The program control information signal is generated by the operations center 202 and provides the network controller 214 with data on the scheduling and description of programs. In an alternate configuration, this data is sent directly to the set top terminal 220 for display to the subscriber. In the preferred embodiment, the program control information signal is stored and modified by the network controller 214 and sent to the set top terminal 220 in the form of a set top terminal control information stream (STTCIS). The set top terminal 220 integrates either the program control information signal or the STTCIS with data stored in the memory of the set top terminal 220 to generate on-screen menus that assist the subscriber in choosing programs for display.

The types of information that can be sent using the program control signal include: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information.

With a minimal amount of information being communicated to the set top terminal 220 on a regular basis, the set top terminal 220 is able to determine the proper menu location for each program and the proper time and channel to activate for the subscriber after a menu selection. The program control information signal and STTCIS can be formatted in a variety of ways and the on-screen menus can be produced using many different methods. For instance, if the program control information signal carries no menu format information, the menu format for creating the menus can be fixed in ROM at the set top terminal 220. In the preferred embodiment, the menu format information is stored at the set top terminal 220 in a temporary memory device such as a RAM or EPROM. New menu format information is sent via the program control information signal or the STTCIS to the set top terminals 200 whenever a change to a menu format is desired.

In the simplest embodiment, the menu formats remain fixed and only the text changes. In this way the program control information signal can be limited to primarily text and a text generator can be employed in the set top terminal 220. Another simple embodiment uses a separate channel full-time (large bandwidth) just for the menu information.

Live video signals may be used in windows of certain menus. These video signals can be transmitted using the program control information signal or STTCIS, or can be taken off channels being transmitted simultaneously with the menu display. Video for menus, promos or demos may be sent to the set top terminal 220 in several formats, including (1) on a dedicated channel, (2) on a regular program channel and scaled to size, or (3) along with the program control information signal. However, in the preferred embodiment, a large number of short promos or demo video is sent using a split screen technique on a dedicated channel. A multiple window technique may be used with the menus to display a description of a program and one or more video frames that assist the subscriber in selecting the program.

Figure 3:
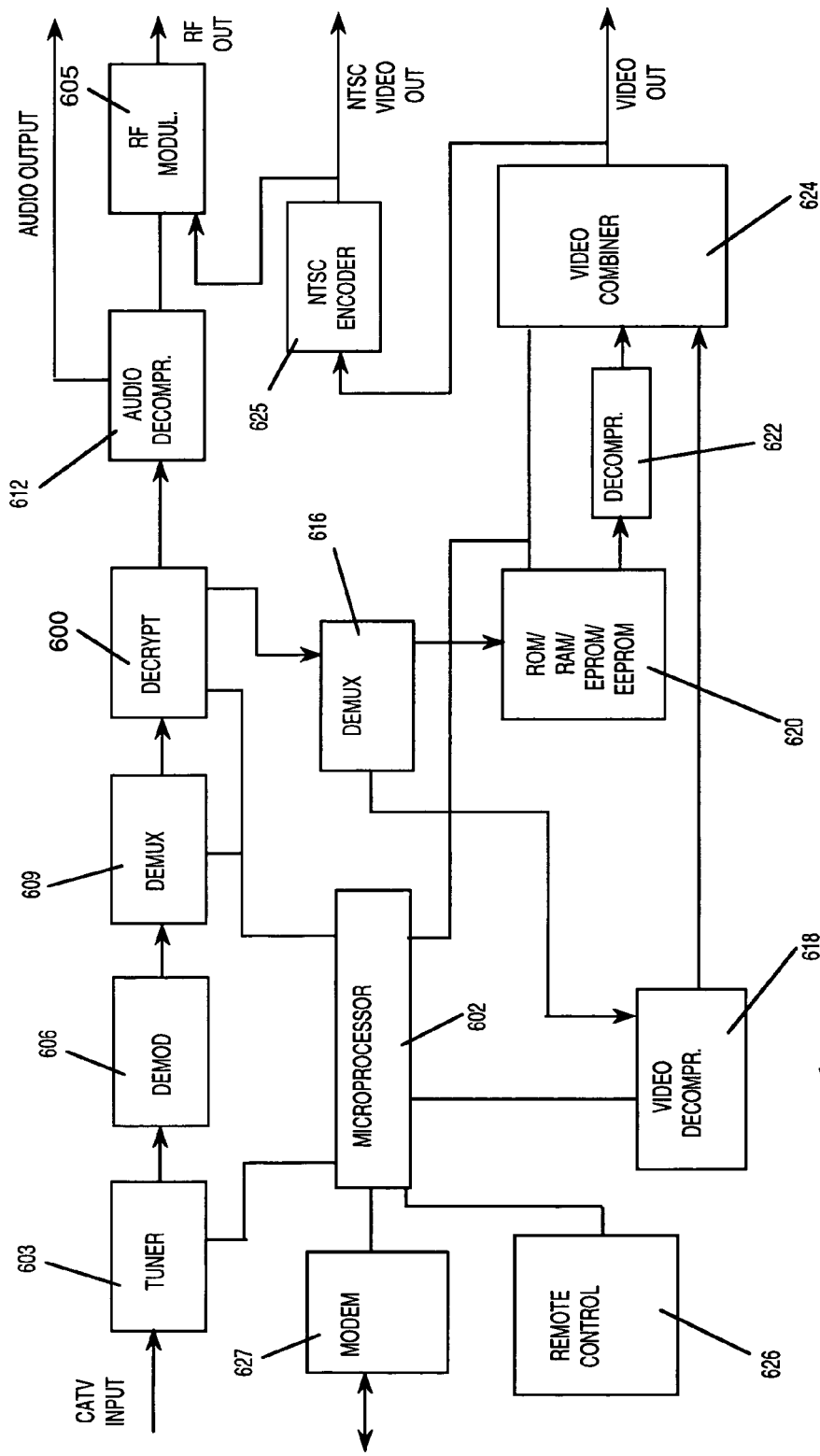
FIG. 3 is a block diagram of the hardware components of the set top terminal.

FIG. 3 shows the basic hardware components of the set top terminal 220. The set top terminal 220 has a tuner 603, digital demodulator 606, decryptor 600, and demultiplexers 609, 616 as well as audio equipment 612 and a remote control interface 626 for receiving and processing signals from the remote control unit 900. An optional modem 627 allows communication between a microprocessor 602 and the cable headend 208. An NTSC encoder 625 provides a standard NTSC video output.

The microprocessor 602 is capable of executing program instructions stored in memory. These instructions allow a user to access various menus by making selections on the remote control 900.

The manner in which the video is decompressed and the menus are generated from the program control information signal or STTCIS varies depending on the specific embodiment of the invention. Video decompressors 618 and 622 may be used if the video is compressed. The program control information signal may be demultiplexed into its component parts, and a video decompressor 618, graphic decompressor, text generator and video combiner 624 may be used to assist in creating the menus.

In addition to the menu format information that is stored in graphics memory, the set top terminal 220 also stores data, tracking those programs that have been selected for viewing. By gathering this data, the set top terminal 220 can maintain an accurate record of all programs accessed/watched by storing the data in EEPROM or RAM. Subsequently, this data can be transmitted to the cable headend 208, where it can be used in carrying out network control and monitoring functions. Such data transmissions between the set top terminal 220 and cable headend 208 can be accomplished, for example, through upstream transmission over the cable network or over telephone lines through the use of telephone modems. Where upstream transmission over the cable network is used, the set top terminals 220 can complete data transmissions on a scheduled (e.g., using a polling response or status report to respond to polling requests sent from the cable headend 208) or as-needed (e.g., using a random access technique) basis.

Figure 4:
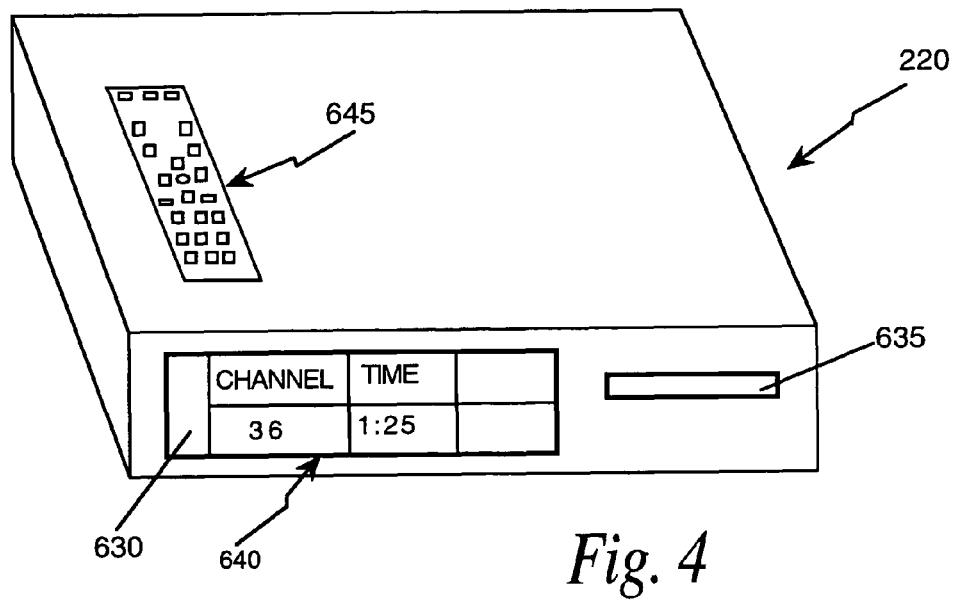
FIG. 4 is a perspective front view of a set top terminal.

FIG. 4 shows the front panel of the set top terminal 220, which includes an infrared sensor 630 and a series of LED displays 640. The LED displays 640 may indicate with an icon or a letter (e.g. A-K) the major menu currently selected by the set top terminal 220 or the channels selected directly by a user, or menu channel selections (e.g., from 1 to 50). Further displays may include current channel, time, volume level, sleep time, parental lock (security), account balance, use of a hardware upgrade, second channel being recorded by VCR, use of the Level D music hardware upgrade in a separate room, and any other displays useful to a subscriber to indicate the current status of the set top terminal 220. The LEDs 640 may also provide an indication of the digital audio channel currently tuned.

The set top terminal 220 includes a flapped opening 635 on its front that allows the insertion of a magnetic cartridge (or similar portable storage device, including optical disk, ROM, EPROM, etc. not shown). This cartridge opening 635 allows the set top terminal 220 to be upgraded or reprogrammed locally with the use of a magnetic tape cartridge.

On the top or cover of the set top terminal 220 are located pushbutton controls 645. Any function that can be performed on the remote 900 may also be performed at the set top terminal 220 using the duplicative pushbutton controls 645.

Figure 5:
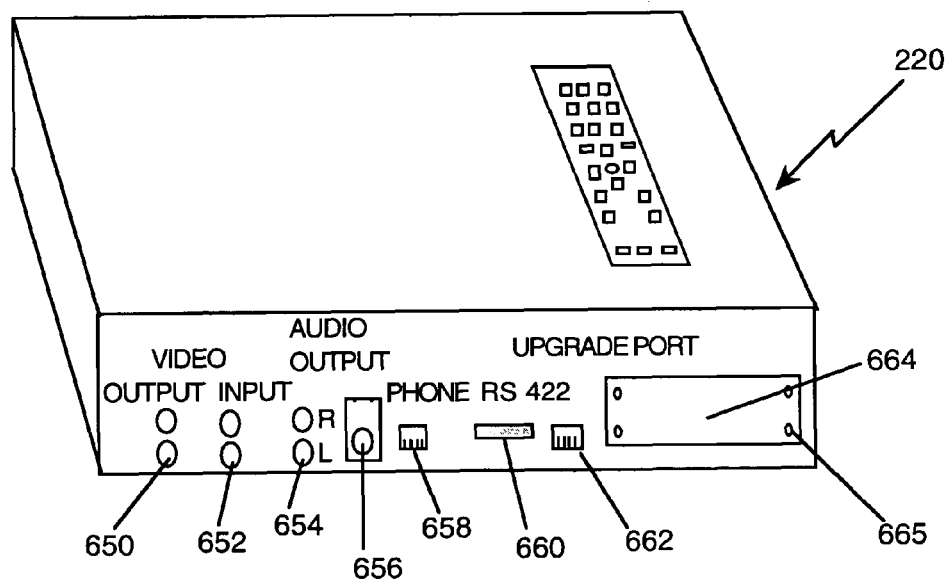
FIG. 5 is a perspective rear view of a set top terminal.

FIG. 5 shows the back of the set top terminal 220, which includes a pair of output terminals 650, pair of input terminals 652, pair of stereo/audio output terminals 654, satellite dish input port 656, telephone jack 658 and an RS-422 port 660. In addition, an upgrade port 662 and a cover plate 664 are held in place by a series of sheet metal screws. One of the output terminals 650 is for a television and the other is for a VCR. The set top terminal 220 is equipped to handle incoming signals on one or two cables using the input terminals 652. The phone jack 658 and an RS-232 or RS-422 port 660 are provided for maintenance, trouble shooting, reprogramming and additional customer features. In alternate embodiments, the telephone jack 658 may be used as the primary mode of communication between the cable headend 208 and the set top terminal 220. This connection is possible through the local telephone, cellular telephone or a personal communications network (PCN).

The basic programming of each set top terminal 220 is located on ROM within the set top terminal 220. Random access memory, the magnetic cartridge capability, and the expansion card slot 635 each allow upgrades and changes to be easily made to the set top terminal 220.

In the preferred embodiment, the set top terminal 220 includes a hardware upgrade port 662, in addition to expansion card slots. The hardware upgrade port 662 accommodates a four-wire (or more) connection for: (1) error corrected, decrypted data output of the set top terminal 220, (2) a control interface, (3) decompressed video output, and (4) a video input port. In the preferred embodiment, multiple wires are used to perform each of the four functions. The four sets of wires are combined in a single cable with a single multipin connector.

In the preferred embodiment, multipin connections may be used for the multiwire cable. The multipin connection 662 may range from DB9 to DB25. A variety of small computer systems interface (SCSI) ports may also be provided. Alternatively, four or more ports may be provided instead of the single port depicted.

Another port 662 is used to attach the various hardware upgrades described below to a set top terminal 220. The preferred embodiment has a number of hardware upgrades available for use with a set top terminal 220, including: (1) a Level A interactive unit, (2) a Level B interactive unit, (3) a Level C interactive unit with compact disc capability, (4) a Level D digital radio tuner for separate room use, and (5) a Level E information download unit. Each of these upgrades may be connected to the set top terminal 220 unit through the upgrade port 662 described earlier. The same four wires in a single cable described earlier may be used.

Existing set top converter boxes such as those made by Scientific Atlanta or General Instruments are presently unequipped to handle the menu selection system of the present invention. Thus, hardware modifications are necessary in order to use the menu selection system with existing set top converter technology.

A Turbo Card addition to a set top converter is depicted in FIG. 6. The Turbo Card 700 shown provides the additional functionality needed to utilize the menu system with existing set top converter technology. The primary functions the Turbo Card 700 adds to the set top converter are the interpreting of program control information signals, generating of menus, sequencing of menus, and, ultimately, the ability of the viewer to select a channel through the menu system without entering any channel identifying information. The turbo card also provides a method for a remote location, such as the cable headend 208, to receive information on programs watched and control the operation of the set top converter and Turbo Card 700. The programs watched information and control commands may be passed from the cable headend 208 to the Turbo Card 700 using telephone lines.

The primary components of the Turbo Card 700 are a PC chip CPU 702, a VGA graphic controller 704, a video combiner 706, logic circuitry 708, NTSC encoder 710, a receiver 712, demodulator 714, and a dialer 716. The Turbo Card 700 operates by receiving the program control information signal from the cable headend 208 through the coaxial cable. The logic circuitry 708 of the Turbo Card 700 receives data, infrared commands, and synchronization signals from the set top converter. Menu selections made by the viewer on the remote control 900 are received by the set top converter's IR equipment and passed through to the Turbo Card 700. The Turbo Card 700 interprets the IR signal and determines the program (or menu) the viewer has selected. The Turbo Card 700 modifies the IR command to send the program selection information to the set top converter 221. The modified IR command contains the channel information needed by the set top converter. Using the phone line and dialer 716, the Turbo Card 700 is able to transmit program access information to the cable headend 208.

In the preferred embodiment, program access information, that is what programs the viewer watched, is stored at each set top terminal 220 until it is polled by the network controller 214 using a polling request message format as shown in FIG. 7*a*. This frame format 920 consists of six fields, namely: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message. FIG. 7*b* shows a response frame format 920' (similar to the frame format 920 end, therefore, commonly numbered with the frame depicted in FIG. 7*a*, but with the prime indicator added for clarity) for information communicated by the set top terminal 220 to the network controller 214 in response to the polling request of FIG. 7*a*.

The eight-bit flag sequence 922 that appears at the beginning and end of a frame is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response from the set top terminal 220 addressed, as described below. The response frame format 920' also provides a variable-length information field 932' for other data transmissions, such as information on system updates. The frame format 920' ends with an 8-bit flag (or trailing flag) 934' that is identical in format to the leading flag 922', as set forth above. Other frame formats (e.g., MPEG) will be apparent to one skilled in the art and can be easily adapted for use with the system.

Figure 8:
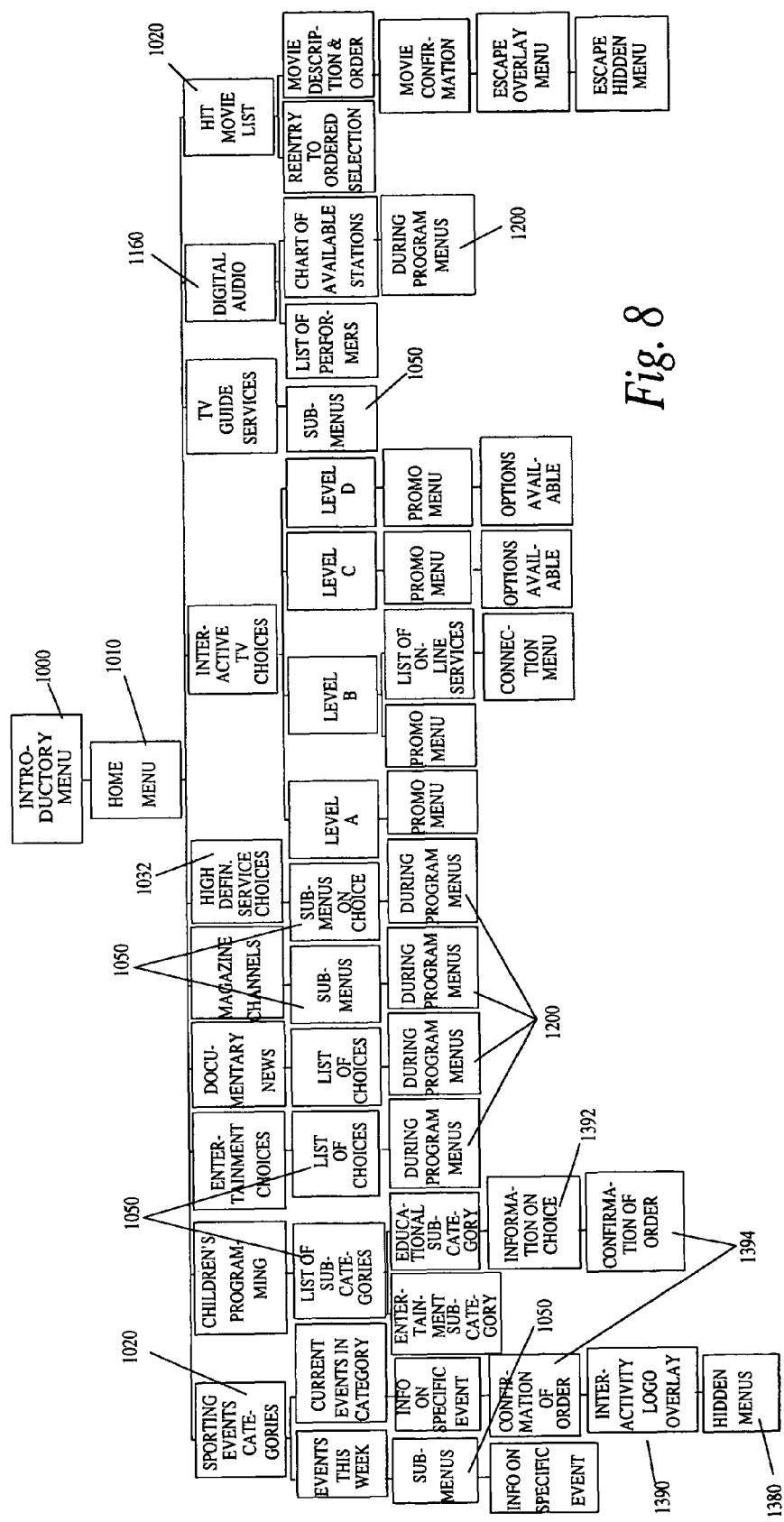
FIG. 8 is a drawing of the basic menus used in the present invention, including the ten major menus represented by icons.

As summarized above, images or programs may be selected for display by sequencing through a series of menus. FIG. 8 is an example of one possible structure for a series of menus. Generally, the sequence of menus is structured with an introductory menu, a home menu, various major menus and a multitude of submenus. The submenus can include promo menus and during program menus. For example, at the home menu portion of the sequence of menus and corresponding software routines, a subscriber may select one of the major menus and start a sequence of menu displays. Alternatively, a subscriber may go directly to a major menu by depressing a menu select button on remote control 900.

At any time during the menu sequence, the subscriber may depress a major menu button to move into another series of menus. In this way, a subscriber may move from major menu to major menu.

The various software subroutines executed by the microprocessor 602 allow a subscriber to sequence the menus, navigating through the various menus of the present invention. A subscriber may sequence back through menus or return to the home menu with a single touch of the home menu button on remote 900.

An introductory menu screen 1000 automatically appears upon power-up and initialization of the set top terminal 220. From this introductory menu screen 1000, the set top terminal software will normally advance the subscriber to the home menu screen 1010. The home menu 1010 is the basic menu that the subscriber will return to in order to make the first level of viewing decisions. When the set top terminal software is displaying the home menu 1010, the subscriber is able to access any television programming option. The software allows programming options to be entered through cursor movement on the screen and directly by button selection on the remote control 900.

In the normal progression through the menu screens, the software will forward the subscriber to a major menu screen 1020 in response to the subscriber's remote control 900 selection or highlighted cursor selection from the home menu screen 1010. The selections displayed on the home menu 1010 are for large categories of programming options.

Following the major menu 1020, the subscriber may navigate through one or more submenu screens 1050 from which the subscriber may choose one particular program for viewing. For most programming selections, the user will proceed from the home menu 1010 to a major menu 1020 and then to one or more submenus 1050. However, for certain programming options or functions of the set top terminal 220, the user may skip one or more menus in the sequence.

The During Program Menus 1200 are submenus enabled by the set top terminal software only after the subscriber has selected a television program. These menus provide the subscriber with additional functionality and/or additional information while viewing a selected program. The During Program Menus 1200 sequence can be further subdivided into at least two types of menus, Hidden Menus 1380 and Program Overlay Menus 1390.

To avoid disturbing a subscriber during viewing of a program, the Hidden Menus 1380 are not shown to the subscriber but instead "reside" at the set top terminal 220 microprocessor 602. The microprocessor 602 awaits a button entry either from the remote control 900 or set top terminal 220 buttons before executing or displaying any Hidden Menu 1380 options. The set top terminal software provides the subscriber with additional functions such as entering an interactive mode or escaping from a selected program through use of Hidden Menus 1380.

Program Overlay Menus 1390 are similar to Hidden Menus 1380. However, the Program Overlay Menus 1390 are overlayed onto portions of the displayed video and not hidden. The software for the Program Overlay Menus 1390 allows the subscriber to continue to watch the selected television program with audio but places graphical information on a portion of the television screen. Most Program Overlay Menus 1390 are graphically generated to cover small portions of video. Some Overlays 1390 which are by their nature more important than the program being viewed will overlay onto greater portions of the video. Examples of types of overlay menus 1390 include Notification Menus 1392 and Confirmation Menus 1394. In the preferred embodiment, the software for the Program Overlay Menus 1390 controls the reduction or scales down the (entire) programs video and redirects the video to a portion of the screen.

Submenus provide the cost of viewing the program and the program's length in hours and minutes. From the submenus, the subscriber is given at least three options: (1) to purchase a program, (2) to return to the previous menu, and (3) to press "go" and return to regular TV. The subscriber may also be given other options such as previewing the program.

Using an on-screen menu approach to program selection, there is nearly an unlimited number of menus that can be shown to the subscriber. The memory capability of the set top terminal 220 and the quantity of information that is sent using the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment described.

The set top terminal 220 generates and creates menus using, in part, information stored in its graphics memory. A background graphics file 800 will store menu backgrounds and a logo graphics file will store any necessary logos. A menu display and cursor graphics file will store menu display blocks and cursor highlight overlays as well as any other miscellaneous files needed to build the menus. Using this method of storing menus, the menus can be changed by reprogramming the graphics memory of the set top terminal 220 through instructions from either the network controller 214 or operations center 202.

The microprocessor 602 performs the steps required to create a menu using stored information. The microprocessor 602 fetches a background file, logo file, menu display and cursor file in most instances. The microprocessor 602 fetches text from long-term, intermediate-term, or short-term storage depending on where the text is stored. Using a video combiner (or like device), the stored information is combined with video and the entire image is sent to the television screen for display.

In the preferred embodiment, a graphics controller is used to assist the set top terminal 220 in generating menus. Menu generation by the set top terminal 220 begins with the building of a major menu screen, which includes background graphics for that major menu. The background graphics may include an upper sash across the top of the screen and a lower sash across the bottom of the screen. The background graphics may be generated from the background graphics file 800 in the memory files of the graphics memory (preferably EEPROM). In addition, logo graphics may be generated. Such graphics typically include an icon window, a cable company logo, a channel company logo, and two "go" buttons.

Preferably, the text for each major menu is generated separately by a text generator in the set top terminal 220. Those portions of the text that generally remain the same for a period of weeks or months may be stored in EEPROM or other local storage. Text which changes on a regular basis, such as the movie titles (or other program selections), is transmitted to the set top terminal 220 by either the operations center 202 or the network controller 214 of the cable headend 208. In this manner, the cable headend 208 may change the program selections available on any major menu 1020 by modifying the program control information signal sent by the operations center 202 and transmitting any changes using the STTCIS.

Day, date and time information are added to each major menu. This information is sent from the operations center 202, the cable headend 208 (signal processor 209 or network controller 214), the uplink site, or generated by the set top terminal 220 internally.

The creation and display of program description submenus is performed by the set top terminal 220 in a manner similar to that described above. Each submenu may be created in parts and combined before being sent to the television screen. Preferably, background graphics and upper and lower sashes are used. Likewise, a video window and half-strip window can be generated from information in storage on the EEPROM.

In addition to graphics and text, some submenus include windows that show video. Such video may be still or moving pictures. Still pictures may be stored in a compressed format (such as JPEG) at the set top terminal 220. Video stills may be transmitted by the operations center 202 through the program control information signal from time to time.

Moving video picture is obtained directly from a current video feed as described above. Depending on video window size, this may require manipulation of the video signal, including scaling down the size of the video and redirecting the video to the portion of the menu screen which is within the video window of the menu. Alternatively, the video may be obtained from a split screen channel. Such a method involves the use of split screen video techniques to send multiple video clips on a single channel at a given time. The set top terminal 220 would scale the picture, if necessary, and redirect it to the correct position on the screen using known scaling and positioning techniques. Additional circuitry may be required in the set top terminal 220 to perform adequate scaling and repositioning.

To avoid the need for redirecting video into the portion of the screen which houses the video window, masking and menu graphics may be used to cover the portions of the channel video that are not needed. This masking technique allows the split screen video to remain in the same portion of the screen that it is transmitted by the operations center 202. The masking is then adjusted to cover the undesired portions of the screen. These masks are stored in the background graphics file similarly to other background files for menus.

The split screen video technique may also be used for promoting television programming. Since a great number of short video clips may be sent continuously, full or partial screen promotionals (or informationals) may be provided to the subscriber. With this large quantity of promotional video, the subscriber is given the opportunity to "graze" through new movie or television programming selections. The subscriber simply grazes from promotional video to promotional video until the desired television program is discovered.

C. Detailed Description of Advanced Set Top Terminal

1. Overview

The present invention involves a set top converter box or terminal 220 for a television program delivery system 200. More specifically, an advanced set top converter box 220 acts as a terminal in the viewer home. The set top terminal 220 is a key component of a digital cable television delivery system 200. The set top terminal 220 is an upgradeable system that provides for the decompression of digital program signals. The preferred set top terminal 220 provides both a menu generation capability as well as a number of advanced features and functional capabilities.

The set top terminal 220 of the present invention may be achieved through a set of hardware upgrades to any of the following embodiments: (1) an existing set top converter 220 upgraded with a circuit card (which has a microprocessor electronically connected to the set top converter 220), such as a Turbo card 700 or the like; (2) an industry standard decompression converter 220 upgradeable by either an upgrade module or a menu generation card; and (3) a set top converter box 220 capable of both decompression and menu generation. The hardware upgrades provide additional advanced features and functional capabilities to any of these embodiments.

A number of advanced features and functional capabilities are supported by the preferred set top terminal 220. This set top terminal 220 provides subscribers with a picture-on-picture capability without requiring a special television to support the capability. The set top terminal 220 also supports a TV guide service, which provides subscribers with information on all programming available at its particular subscriber location. The set top terminal 220 further includes the capability of querying viewers to establish, among other things, favorite channel lists, personal profile data and mood information. The set top terminal 220 allows the subscriber to view promotional menus on future programming events.

The set top terminal 220 supports additional capabilities using its hardware upgrades that allow subscribers to use other interactive services, for example, to engage in on-line question and answer sessions, to order and confirm airline tickets, and to access a variety of other data services. The set top terminal 220 makes use of a digital tuner as a hardware upgrade to provide subscribers with a digital audio capability.

The preferred set top terminal 220 may be used to control video tape machines, thereby simplifying the recording of programs. The set top terminal 220 can, in conjunction with the program delivery system 200, easily support high definition television (HDTV). For subscribers living in remote locations, the set top terminal 220 accommodates backyard satellite systems. In addition to all the features that the set top terminal 220 supports with its current internal programming and upgradeability, additional features may be added or existing features increased through remote reprogramming of the set top terminal 220.

Table A shows several exemplary hardware configurations that may be used to achieve the goals of the present invention. In particular, Table A shows four columns of set top converter technology, which may be modified to produce the various set top capabilities shown in the three rows of the table.

TABLE A

| | Existing Analog Set Top Converter | Set Top Converter With Digital Decompression | Set Top Converter With Digital Decompression & Menu Generation Capabilities | Advanced Set Top Terminal |
|---|---|---|---|---|
| Decompression Capability | N/A | Built-In | Built-In | Built-In |
| Menu Generation Capability | Turbo Card | Upgrade Module or Menu Generation Card | Built-In | Built-In |
| Advanced Features | Level A-C Hardware Upgrades or Expansion Card | Level A-E Hardware Upgrades or Expansion Card | Level A-E Hardware Upgrades or Expansion Card | Built-In |

The table shows the various inherent functional capabilities of each set top converter, and how each may be modified or upgraded, if necessary, to achieve the objectives of the present invention. From left to right, the columns of the table span the various alternatives for balancing those capabilities that may be built into set top converters or terminals, on the one hand, and those capabilities that can be provided through, for example, an upgrade module, expansion card or hardware upgrade of the present invention, on the other. This balance allows a designer or manufacturer of set top converters to choose between adding advanced functionality to an existing converter box or, instead, producing a converter with additional built-in features that increase cost and complexity of the converter or terminal.

The first column of Table A shows how an existing analog set top converter can be modified to provide menu generation capability through the use of the Turbo Card. In addition to the Turbo Card, such an existing analog set top converter may be further modified to provide any of the advanced features described below through the use of the Level A, Level B and Level C hardware upgrades or an expansion card. Such existing set top converter boxes are currently manufactured by Scientific Atlanta and General Instruments, among others. These converter boxes have been designed for use with analog waveforms and, as a result, digital decompression capabilities are not applicable.

The second column of Table A shows a set top converter with digital decompression capability. This converter is a simple decompression box which may eventually become the industry standard. The simple decompression boxes may be modified to provide the enhanced functionality of the present invention. For example, a simple decompression box may be modified to produce menu generation capability through the use of an upgrade module or menu generation card. In addition, other advanced features may be added to a simple decompression box through modifications that include any of the Level A through E hardware upgrades or an expansion card. Each of these modifications are described below.

The third column of Table A shows a set top converter that has built-in digital decompression and menu generation capabilities. Thus, in order to achieve the enhanced functionality of the present invention, other advanced features may be provided through hardware modification. Such modification may be accomplished through the use of any of the Level A through E hardware upgrades or the expansion card, as explained below.

The fourth column of Table A shows an advanced set top terminal having decompression, menu generation, and advanced functional capabilities. Each of these capabilities are built in to the terminal itself. In this way, achieving the enhanced performance of the set top terminal in accordance with the present invention would require no hardware modification.

In the preferred embodiment, the advanced set top terminal 220 of the present invention has the capability, among other things, of receiving tiered programming from the network controller. Tiered programming allows different users to view different video even though the subscribers are "tuned" to the same channel. For example, the network controller 214 may know the demographics of its subscribers through a database, by "learning" from prior subscriber choices, from an interactive selection, or from other means. Using the demographics information, the network controller 214 may target commercials to the correct audience by showing different commercials to subscribers with different demographics. Even though subscribers will believe they are "tuned" to one channel, each subscriber will be switched to a different channel for the tiered video. Alternatively, subscribers may be offered an option of several commercials from which to choose.

To accommodate foreign speaking subscribers, multiple audio channels for television programming may be provided. In this way, the subscriber may be shown menus of programs available in the subscriber's native language. The function of choosing the correct audio to correspond to the selected language may be handled by either the set top terminal 220 or the network controller 214 depending upon the configuration. Local programming in several languages or additional audio channels for a foreign language translation of a popular television program may be provided by the network controller 214. Using a picture-on-picture feature, sign language may be similarly made available to certain set top terminals 220 for the deaf. Also, a text overlay may easily be produced on the lower part of the screen for the deaf.

Typically, each video signal is received at the set top terminal 220 along with four audio channels. Two of these audio channels will preferably be used for left and right stereo audio reception of the video signal being displayed. The remaining two audio signals may be used for alternative languages. For example, where a video signal is received by the set top terminal 220, two of the audio channels will provide the stereo audio signals for that video in English, with the other two audio channels providing mono audio signals in French and Spanish. In this way, each video signal received at the set top terminal 220 can accommodate at least two foreign languages. Where stereo audio channels are not desired, the audio channels in English can be set to a single signal, providing mono audio reception, and increasing the multiple language audio channel capability to three foreign languages.

In other embodiments, the network controller 214 can act as a central computer and provide intra-set top terminal interactive games, inter-set top terminal interactive games, computer bulletin board type services, message services (Electronic mail) etc. For example, a subscriber may play war games with five (anonymous) fellow subscribers each in their own home each operating a separate tank. The network controller 214 gathers the players via set top terminal 220 communications and acts as the referee. A bulletin board or message system can be set up to discuss a particular program such as "Twin Peaks Whodunit" for enthusiasts. These interactive features are further described below with the interactive services level B menu and the set top terminal hardware upgrade level B interactive unit.

In order to achieve the required throughput of video and audio information for the system, digital compression techniques for video are employed. As a result, the set top terminal 220 typically must decompress any digitally compressed program signals that it receives. Methods of decompression are a function of the compression technique used in the program delivery system.

There are three basic digital compression techniques: within-frame (intraframe), frame-to-frame (interframe), and within-carrier compression. Various compression methods may be used with these techniques. Such methods of compression, which include vector quantization and discrete cosine transform methodologies, are known to those skilled in the art.

Several standard digital formats representing both digitizing standards and compression standards have also been developed. For example, JPEG (joint photographic experts group) is a standard for single picture digitization. Motion picture digitization may be represented by standards such as MPEG or MPEG 2 (motion picture engineering group specification). In addition to these standards, other proprietary standards have been developed. Although MPEG and MPEG 2 for motion pictures are preferred in the present invention, any reliable digital format with compression may be used.

Various hybrids of the above compression techniques and methods have been developed by several companies including AT&T, Compression Labs, Inc., General Instruments, Scientific-Atlanta, Philips, and Zenith. Any of the compression techniques developed by these companies, as well as other techniques known to those skilled in the art, may be used with the present invention.

Figure 9A:
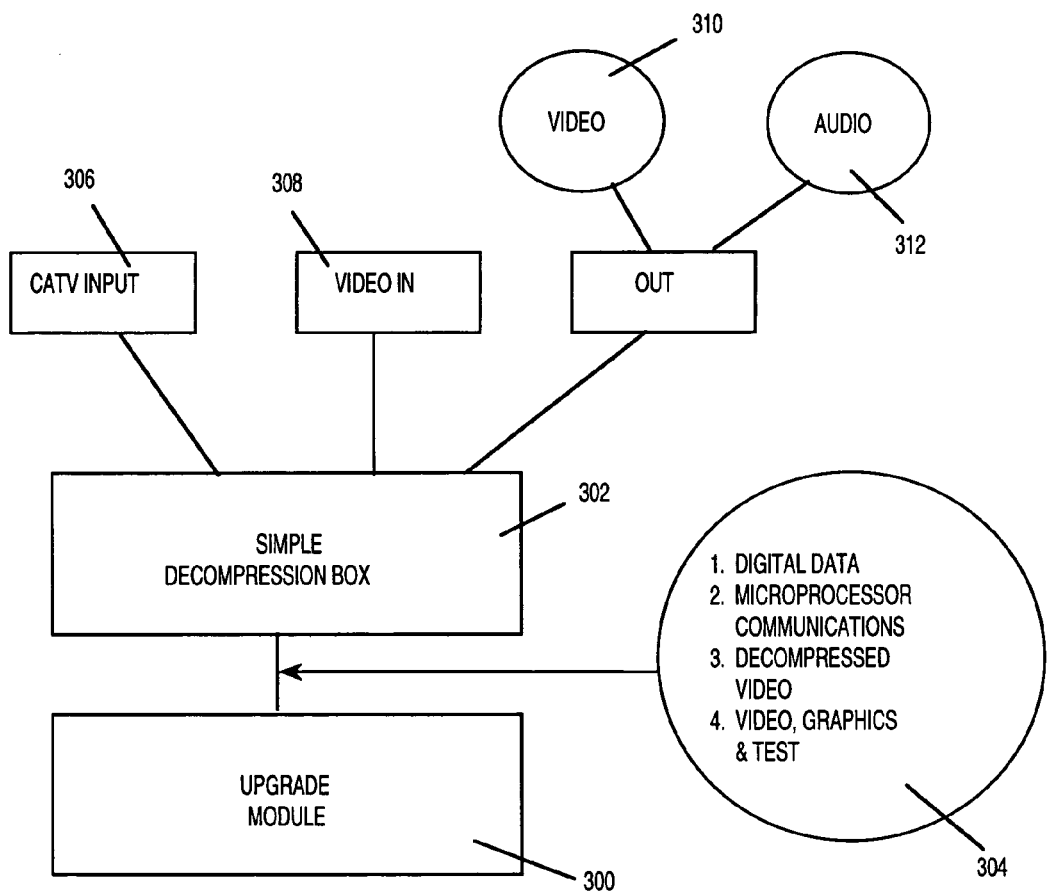
FIG. 9a is a schematic of a basic decompression box with upgrade module and associated connections.

2. Advanced Set Top Terminal Major Components and Upgrades a. Decompression Box with Upgrade Module The preferred program delivery system uses digitally compressed signals and, as a result, the preferred subscriber equipment configuration must be capable of decompressing and processing such digitally compressed signals. FIG. 9a diagrams the basic interplay between an upgrade module 300 and a simple decompression box 302. The upgrade module 300 can be connected to the decompression box 302 through a port similar to the upgrade port 662 described above (FIG. 5). The simple decompression box 302 shown is preferably a future industry standard decompression box capable of communicating with an upgrade module 300 to enhance functionality.

The upgrade module 300 provides menu generation capability to the simple decompression box 302. The microprocessor of the simple decompression box 302 communicates with the microprocessor in the upgrade module 300 to provide the full functionality of a set top terminal 220.

In the preferred embodiment, multipin connections may be used for a multiwire cable connecting the simple decompression box 302 with the upgrade module 300. The multipin connection may range from DB9 to DB25. A SCSI, or small computer systems interface, port (not shown) may also be provided. Alternatively, four or more ports may be provided instead of the single port depicted. If a port is not provided, the upgrade module may, alternatively, be hard-wired to the simple decompression box 302.

As represented generally at 304, the digital data set of output wires of the simple decompression box 302 will preferably output error corrected and decrypted data to the upgrade module 300. The second set of wires, providing the interface connection, allows the microprocessor in the upgrade module 300 to communicate with the microprocessor of the simple decompression box 302. In this manner, the video circuitry of the upgrade module 300 and the simple decompression box 302 may maintain synchronization. The third set of wires, providing the decompressed video output, provide the upgrade module 300 with a decompressed video signal to manipulate. The fourth set of wires, comprising the video input set, allows the simple decompression box 302 to accept a video signal that is a combined text, graphics, and video signal.

Figure 9B:
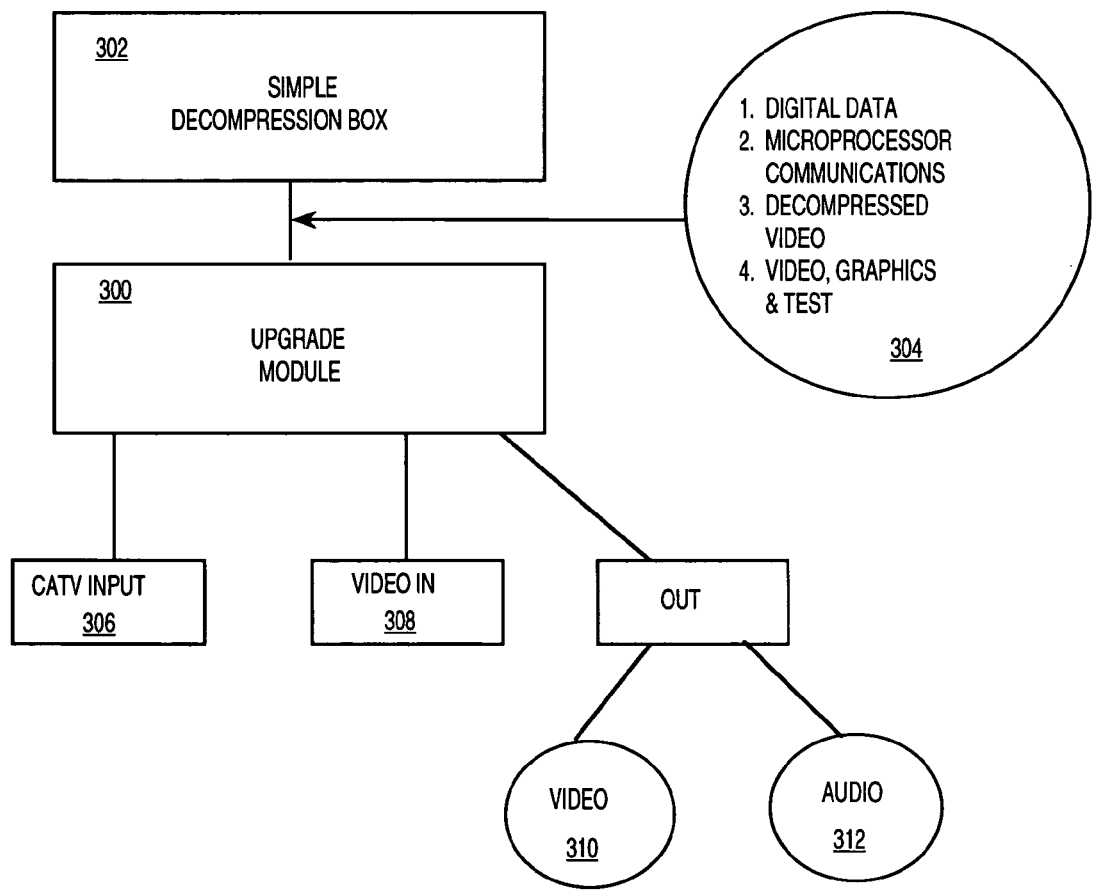
FIG. 9b is a schematic of an alternative embodiment of a simple decompression box with upgrade module and associated connections.

FIG. 9a further shows the CATV input 306, video input 308, and video and audio outputs 310, 312, as part of the simple decompression box 302. This embodiment reduces the component cost of upgrade module 300, and thus, is preferred. The upgrade module 300 may simply be a cartridge (not shown) insertable into the simple decompression box 302. Alternatively, as shown in commonly numbered FIG. 9b, the CATV input 306, video input 308 and video and audio outputs 310, 312 may be included as part of the upgrade module 300. In this embodiment, the simple decompression box 302 is primarily used for decompressing the video.

Figure 10:
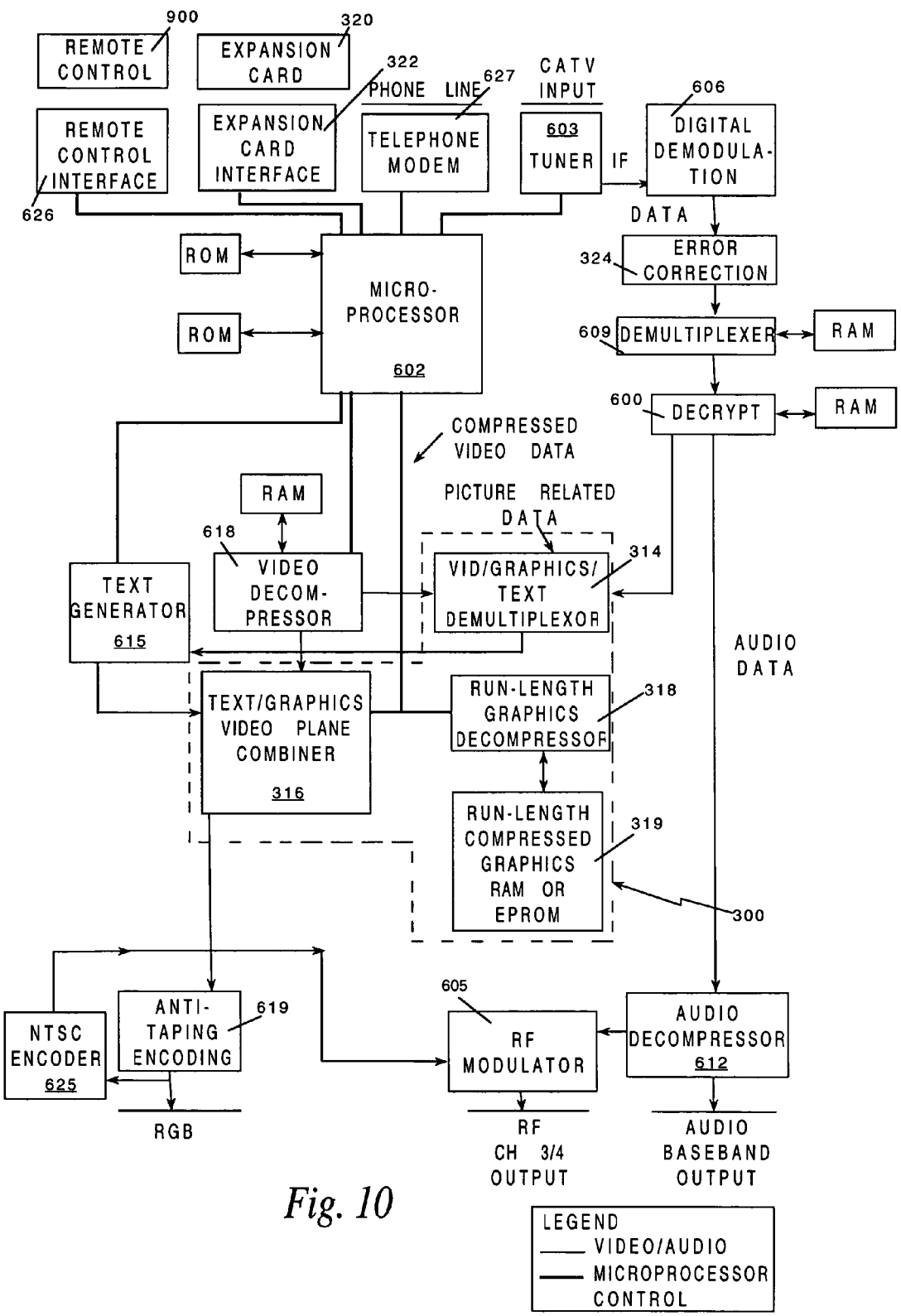
FIG. 10 is a more detailed block diagram of the components of a simple decompression box with upgrade module.

Referring to FIG. 10, the upgrade module 300 preferably includes the following circuitry: a video graphics and text demultiplexer 314; a text and graphics video plane combiner 316; a run length graphics decompressor 318; and, a run length compressed graphics memory 319 (nonvolatile RAM, ROM, EPROM, or EEPROM). By means of communications through the multiwire connection between the upgrade module 300 and the simple decompression box 302, compressed video and control signals may be demultiplexed by the demultiplexer 314 within the upgrade module 300. The run length graphics decompressor 318, through communications with the run length compressed graphics RAM 319, permits decompression of the input compressed video signal. The text and graphics video plane combiner 316 allows demultiplexed and decompressed signals to be output, through the simple decompression box 302, to a subscriber's television 222 showing both video and overlay menus with text.

FIG. 10 shows the elements of a simple decompression box 302 (numbered commonly with the elements of the set top terminal 220 depicted in FIG. 3) with the upgrade module 300 described above. Generated menus and video are combined in the combiner 316 and output to an antitaping encoder 619. Any method of antitaping encoding known by those skilled in the art may be used with the present invention.

FIG. 10 also depicts an expansion card 320 and an expansion card interface 322 for receiving the card 320. In addition, error correction circuitry 324 is shown receiving the demodulated signal, prior to demultiplexing the signal.

The enhanced functionality of the upgrade module 300 may alternatively be included on the expansion card 320. In this embodiment, the upgrade module 300 becomes an internal component of the simple decompression box 302 and internally upgrades the box 302 to include menu generation capability without using an external hardware upgrade module 300. Other variations in the upgrade module 300 configuration are also possible.

b. Upstream Data Transmission

Figure 11:
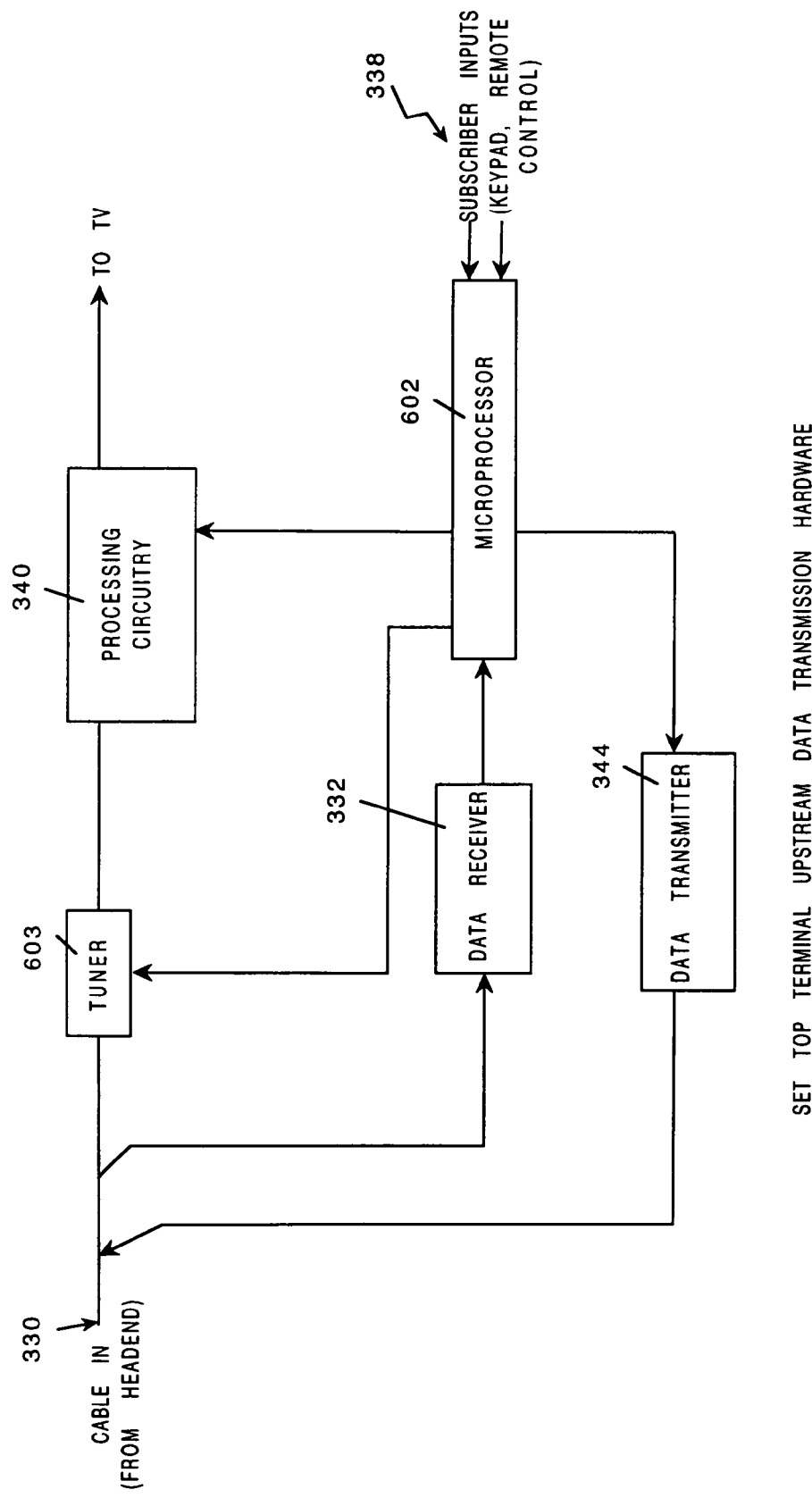
FIG. 11 is a schematic of the set top terminal's upstream data transmission hardware.

FIG. 11 shows a preferred set top terminal 220 that includes a data receiver 332 and a data transmitter 344. The data transmitter 344 provides upstream data communications capability between the set top terminal 220 and the cable headend 208. Upstream data transmissions are accomplished using the polling system described with reference to FIGS. 7a and 7b above, and, in particular, using a data transmitter 344. Both receiver 332 and transmitter 344 may be built into the set top terminal 220 itself or added through an upgrade module 300. Regardless of the specific hardware configuration, the set top terminal's data transmission capabilities may be accomplished using the hardware shown in FIG. 11.

FIG. 11 shows RF signals, depicted at 330, being received at by a data receiver 332 and tuner 603 working in unison. Both of these devices are interfaced with the microprocessor 602, which receives inputs, depicted at 338, from the subscriber, either through the set top terminal's keypad 645 or remote control unit 900. All cable signals intended for reception on the subscriber's TV are accessed by the tuner 603 and subsequently processed by the processing circuitry 340. This processing circuitry 340 typically includes additional components for descrambling, demodulation, volume control and remodulation on a Channel 3 or 4 TV carrier.

Data targeted to individual set top terminals 220 is received by the data receiver 332 according to each set top terminal's specific address or ID (e.g. set top ID 928, 928'). In this way, each addressable set top terminal 220 only receives its own data. The data receiver 332 may receive set top terminal specific data in the information field of the program control information signal frame described with reference to FIG. 7a or on a separate data carrier located at a convenient frequency in the incoming spectrum.

Any received data includes information regarding channels and programs available for selection. The subscriber may enter a series of commands using the keypad 645 or remote control 900 in order to choose a channel or program. Upon receipt of such commands, the set top terminal's microprocessor 602 instructs the tuner 603 to tune to the proper frequency of the channel or program desired and subsequently instructs the processing circuitry 340 to begin descrambling of this channel or program.

Upon selection of a channel or program, the microprocessor 602 stores any selection information in local memory for later data transmission back to the cable headend 208. Typically, the data transmitter 344 operates in the return frequency band between 5 and 30 MHZ. In an alternative embodiment, the frequency band of 10 to 15 MHZ may be used. Regardless, however, of the frequency band used, the data transmitter 344 sends information to the cable headend 208 or network controller 214 in the information field of the frame described with reference to FIG. 7b. Those skilled in the art will recognize that a number of variations and combinations of the above-described set top terminal 220 hardware components may be used to accomplish upstream data transmissions.

c. Hardware Upgrades

In order to enhance a set top terminal's 220 functionality, the following hardware upgrades may be used: (1) a Level A interactive unit, (2) a Level B interactive unit, (3) a Level interactive unit with compact disc capability, (4) a Level D digital radio tuner for separate room use, and (5) a Level E information download unit. Each of these upgrades is connected to the set top terminal 220 unit through the upgrade port 662 described earlier.

Figure 12A:
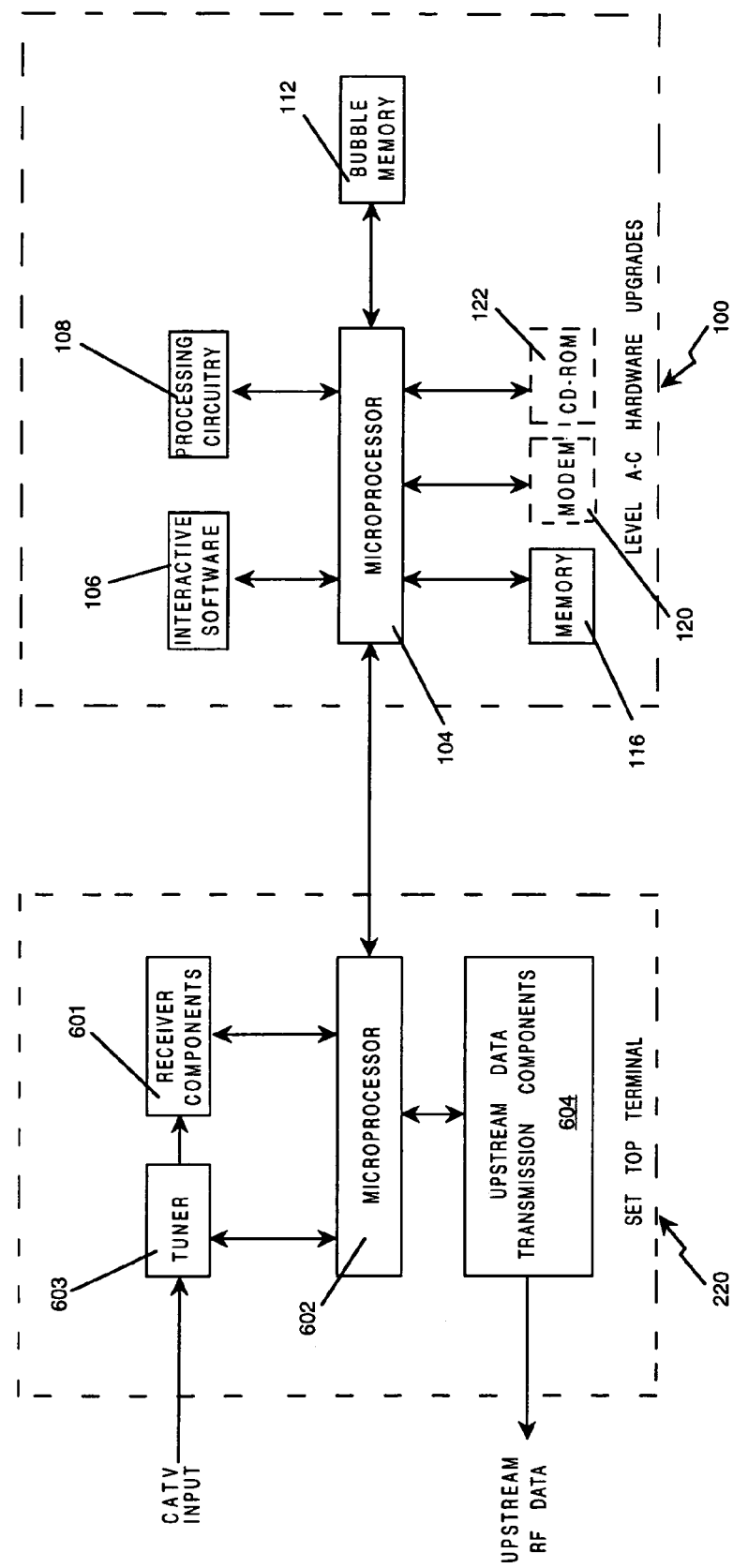
FIG. 12a is a schematic showing the components of the Level A, B, and C hardware upgrades.

Level A, B and C hardware upgrades have similar hardware components. FIG. 12a diagrams the basic components of the Level A, B and C hardware upgrades, indicated generally at 100. The figure diagrams the interaction between the hardware upgrades 100 and the set top terminal's 220 basic components. As seen in the figure, CATV input signals are received by the set top terminal 220 using a tuner 603 and various receiver components described above (but denoted generally at 601 in FIGS. 12a and 12b). The set top terminal's microprocessor coordinates all CATV signal reception and also interacts with various upstream data transmission components 604, which have been described above.

The Level A, B and C hardware upgrades 100 each include a microprocessor 104, interactive software 106, processing circuitry 108, bubble memory 112, and a long-term memory device 116. In addition to these basic components, the Level B hardware upgrade makes use of an additional telephone modem 120, while the Level C hardware upgrade makes use of an additional CD-ROM storage device 122.

Along with their basic components, the Level A, B and C hardware upgrades 100 each use their own interactive software 106. This software may be used to provide the enhanced functional capabilities described below. The Level A, B and C hardware upgrades also make use of processing circuitry 108, which allows the set top terminal 220 to pass the subscriber's interactive input to the Level A, B and C hardware upgrades 100 for interpretation. These commands are passed through the interface linking the set top terminal's microprocessor with the microprocessor of the Level A, B and C hardware upgrades 100. In this way, subscriber inputs, entered through the set top terminal keypad or remote control, can be transferred to any of the hardware upgrades for processing and responses generated therein can then be sent back to the set top terminal 220 for display. In the preferred embodiment the IR commands are transferred from set top terminal to hardware upgrade.

The Level A, B and C hardware upgrades 100 also include a long-term memory component or device 116 that allows each hardware upgrade to internally store data used with each interactive service. Such data may include, for example, customized menu templates used by the individual interactive services. In addition, the Level A, B and C hardware upgrades include a bubble memory 112 for the temporary storage of, for example, interactive questions and responses used in each particular interactive service.

The Level A interactive unit allows the subscriber to access interactive services offering additional information about programs such as quizzes, geographical facts, etc. This information may be received by the set top terminal 220 in several data formats, including using the vertical blanking interval (VBI) or the program control information signal. The Level A interactive unit enables the subscriber to engage in textual interactivity with the current television program using overlay menus. Some examples are quizzes, fast facts, more info, where in the world, products, etc, all of which provide the subscriber with an interactive question and answer capability. Although the Level A interactive capability can easily be built into the set top terminal 220, such an embodiment increases the cost of the basic set top terminal 220.

The Level B interactive unit provides the user with access to online data base services for applications such as home shopping, airline reservations, news, financial services, classified advertising, home banking, and interactive teletext services. For example, with this upgrade, a user will be able to reserve plane tickets or buy consumer electronics. The primary feature of this upgrade unit is that it allows actual transactions using two-way communications over modem with outside services. This added two-way communications capability may be with the cable headend 208 or, alternatively, over cellular networks, PCN or other communications media.

The Level C interactive unit employs a high volume local storage capacity, including compact disc or other random access digital data formats (e.g., CD-ROM 122). This unit allows use of interactive multi-media applications. Such applications include, for example, computer games, multimedia educational software, encyclopedias, other reference volumes (e.g. Shakespeare library), etc. In the preferred embodiment, many of these applications will interact with live programming providing additional information and interactivity to the basic program feed. For example, a viewer watching a show set in a foreign country may be able to retrieve additional information, maps, economic data, as well as other information about that country that are stored on the compact disc. In the Level C applications, the upgrade hardware may closely monitor the television broadcast through additional data channels (e.g., vertical blanking interval, or other digital data encoded within live video) providing context sensitive interactivity.

Figure 12B:
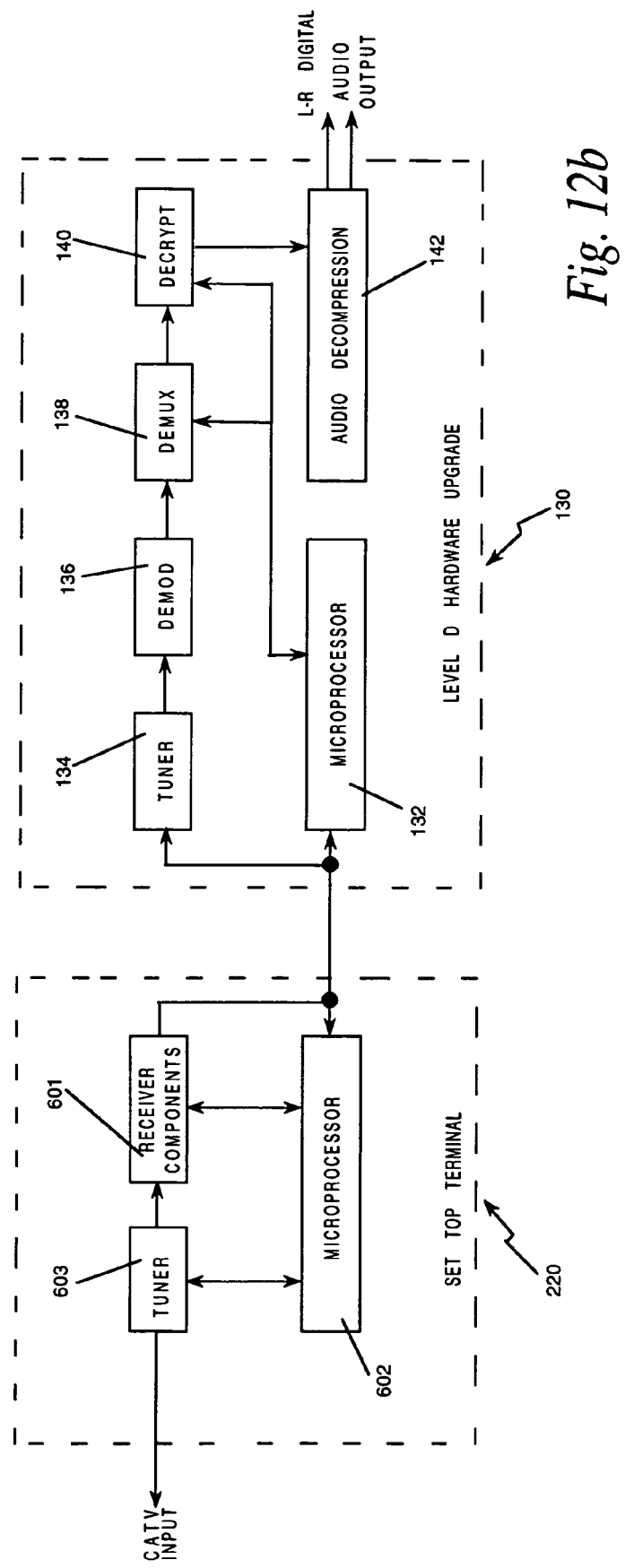
FIG. 12b is a schematic showing the components of the Level D hardware upgrade.

FIG. 12b diagrams the interaction between the set top terminal 220 and the Level D hardware upgrade, indicated generally at 130. As shown in the figure, the CATV signals are input to the set top terminal 220 through its tuner 603 and receiver components 601. As described above, the microprocessor 602 coordinates all cable television signal reception by the set top terminal 220. The Level D hardware upgrade 130 makes use of a microprocessor 132, a tuner 134, a demodulator 136, a demultiplexer 138, a decryptor 140 and an audio decompressor 142.

As shown in the figure, the set top terminal 220 and the Level D hardware upgrade 130 interact through the interface linking the respective devices. The set top terminal's microprocessor 602 instructs received signals to be transferred to the Level D hardware upgrade 130 for further processing. These received signals are input to the Level D hardware upgrade, passed through the signal path comprising the tuner 134 and other digital audio reception components (i.e., demodulator 136, demultiplexer 138, decryptor 140 and audio decompressor 142). Through the use of the hardware as configured in FIG. 12b, the subscriber can select a digital audio program for listening. The subscriber can accomplish such selection through a subscriber interface (not shown), which may exist at the set top terminal 220 or, alternatively, at the Level D hardware upgrade.

The Level D hardware upgrade allows the subscriber separate access to the digital radio channels while other programming (not necessarily radio) is being viewed on the television. Typically, this upgrade would be used for digital radio usage in a separate room from that of the television. The upgrade has a separate tuner, decompressor, and visual display. In the preferred embodiment a second remote control (which is preferably a scaled-down version of the set top terminal remote control, described below) is provided to access the digital audio system. This remote is equipped with a display.

The Level E hardware upgrade allows the subscriber to download large volumes of information from the operations center 202 or cable headend 208. The Level E hardware upgrade will enable subscribers to download data, such as books and magazines, to local storage. Primarily, the Level E hardware upgrade is an additional local storage unit (e.g., hard disk, floppy, optical disk or magnetic cartridge). Preferably, a small portable reader, called "EveryBook™", is also provided with the upgrade to enable downloaded text to be read without the use of a TV. The portable reader is equipped with a screen.

The downloadable information may be text or video supplied by the operations center 202 or cable headend 208. With this upgrade, books may be downloaded and read anywhere with the portable reader. Using this upgrade, video may be downloaded and stored in compressed form for later decompression. The video would be decompressed only at the time of viewing. Important text that the public desires immediate access may made available through this system. Text such as the President's speech, a new law, or a recent abortion decision rendered by the Supreme Court may be made immediately available.

Using a more sophisticated port, such as the SCSI port, multiple hardware upgrade units may be connected, or "daisy-chained" together, to operate simultaneously. Although these upgrade units are described separately, the units may be combined or built into the set top terminal 220. Those skilled in the art will recognize variations on such combinations of and additions to the set top terminal hardware.

d. Expansion Card Slot

In order to provide the greatest flexibility possible and prevent a set top terminal 220 from becoming outdated during the terminal's useful life, additional electronic expansion card slots have been built into the preferred embodiment. The expansion slots 665 (depicted in phantom in FIG. 5) are covered by the metal plate cover 664 as shown in FIG. 5. It is anticipated that additional memory or capabilities may be needed for certain customer features and also to update the system as the cable delivery system's capabilities increase.

In addition to providing an additional memory capability, the expansion card slot provides an easy method to upgrade the set top terminal hardware. In particular, expansion cards can be used to internally provide any of the Level A through E hardware upgrade features described above. Such embodiments, however, use the upstream data transmission hardware, also described above (or built-in modem).

Functionally, the expansion card (not shown) may be inserted into an expansion card slot 665, causing the connector on the expansion card to electrically link with a card connector on the set top terminal 220. Preferably, the frame of the set top terminal has a shelf or rack position to hold the expansion card. The card connector on the set top terminal 220 may simply be an electrical connection to the set top terminal's microprocessor and/or memory device or devices. Alternatively, the interface between the expansion card and the set top terminal 220 may be an electrical bus that allows the memory resources of the set top terminal 220 to be directly expanded. In this case, the expansion card itself contains a memory device or devices that expand the amount of program information or data that the set top terminal 220 may access. Such memory devices include RAM, ROM, EPROM or EEPROM. In addition, the interface may be a "mailbox," which resides in the set top terminal 220 as a single memory location. This embodiment facilitates the transfer of data between the set top terminal 220 and the expansion card in either serial or parallel format. Such transfers are coordinated and controlled by the set top terminal's microprocessor 602.

The use of expansion cards lowers the cost of the set top terminal 220 itself, while also increasing its potential functionality. Thus, an expansion card may include enhanced functional capabilities described as part of the upgrade module discussion above and be designed to accommodate any hardware upgrade compatible with the set top terminal 220.

3. Advanced Features and Functional Capabilities a. Overview

In the preferred embodiment, the set top terminal 220 will include features that are now being adopted in the industry, including parental controls and locks, electronic diagnostics and error detection, muting, on-screen volume control, sleep timer, recall of last selection, etc. Each of these features has a corresponding menu (or overlay menu) that allows on-screen customizing and activation of the feature.

The preferred set top terminal 220 also supports a number of advanced features and functional capabilities. This set top terminal 220 provides subscribers with a picture-on-picture capability without requiring a special television to support the capability. The set top terminal 220 also supports a program catalogue Service, which provides subscribers with information on all programming available at its particular subscriber location. The set top terminal 220 further includes the capability of querying viewers to establish, among other things, favorite channel lists, personal profile data and mood information. The set top terminal 220 allows the subscriber to view promotional menus on future programming events.

The set top terminal 220 supports additional capabilities using its hardware upgrades that allow subscribers to use other interactive services, for example, to engage in on-line question and answer sessions, to order and confirm airline tickets, and to access a variety of other data services. The set top terminal 220 makes use of a digital tuner as a hardware upgrade to provide subscribers with a digital audio capability.

The preferred set top terminal 220 may be used to control video tape machines, thereby simplifying the recording of programs. The set top terminal 220 can, in conjunction with the program delivery system, easily support high definition television (HDTV). For subscribers living in remote locations, the set top terminal 220 accommodates backyard satellite systems.

In addition to all the features that the set top terminal 220 supports with its current internal programming and upgradeability, additional features may be added or existing features increased through remote reprogramming of the set top terminal 220. Utilizing the resident operating system on the read only memory (ROM), the cable headend 208 is able to reprogram the random access memory (RAM) of the set top terminal 220. With this capability, the cable headend 208 can remotely upgrade software on the set top terminals 220.

Reprogramming will occur by using the program control information signal, with the appropriate signals sent over this signal. In an alternative embodiment, one channel is dedicated for the special programming needs. When reprogramming is to occur, the cable head end will send an interruption sequence on the program control information channel that informs the set top terminal 220 that reprogramming information is to follow.

b. Promotional Menus

Figure 13:
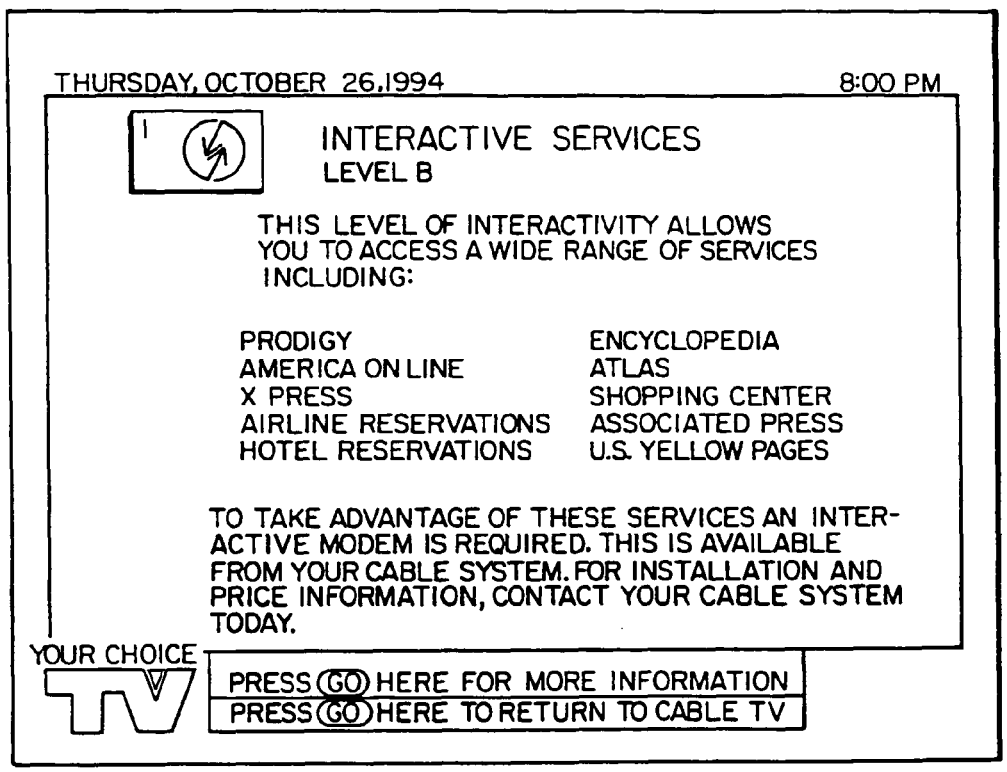
FIG. 13 is a drawing of an interactive television promotional menu for a set top terminal hardware upgrade.

FIG. 13 depicts the use of a promotional menu 1120 used to sell subscriptions to services in the system 200. This promotional menu is tailored to Level B interactive services which include a variety of on-line type services such as Prodigy, Yellow Pages, Airline Reservations, etc. A similar menu is used for Level A interactive services that offers subscribers additional information about programs such as quizzes, geographical facts, etc. Such information may be received by the set top terminal 220 in several data formats, including in the vertical blanking interval (VBI) and in the program control information signal.

Other promotion menus similar to menu 1120 may be used for the Level C interactive services. The Level C interactive services utilize local storage such as CD technology (e.g., 122) to offer an enormous range of multi-media experiences. The Level C interactive services require a hardware upgrade as described earlier. Specially adopted CD-I and CD-ROM 122 units are used for this service.

Typically, promotional menus may be generated when a subscriber selects a nonexistent channel, creating a virtual channel. Such virtual channels do not require any additional bandwidth since these channels do not carry any of the data required to create a promotional menu. Instead, when the subscriber selects a channel that does not exist (e.g., Channel 166), a virtual channel is created using data sent to the set top terminal in a number of ways. For example, the data may be sent in the vertical blanking interval (VBI) of another channel, out-of-band, or with the menu information sent from the headend 208 in the set top terminal control information stream (STTCIS). The data will be used to create graphics stored locally at the set top terminal 220 as an NTSC video signal which may be displayed on the subscriber's television. In this way, a promotional menu may be drawn and a virtual channel is created. This capability simply provides the set top terminal 220 with the ability to display a promotional menu or graphics display whenever a nonexistent channel is selected by the subscriber.

c. Other Interactive Services

Figure 14A:
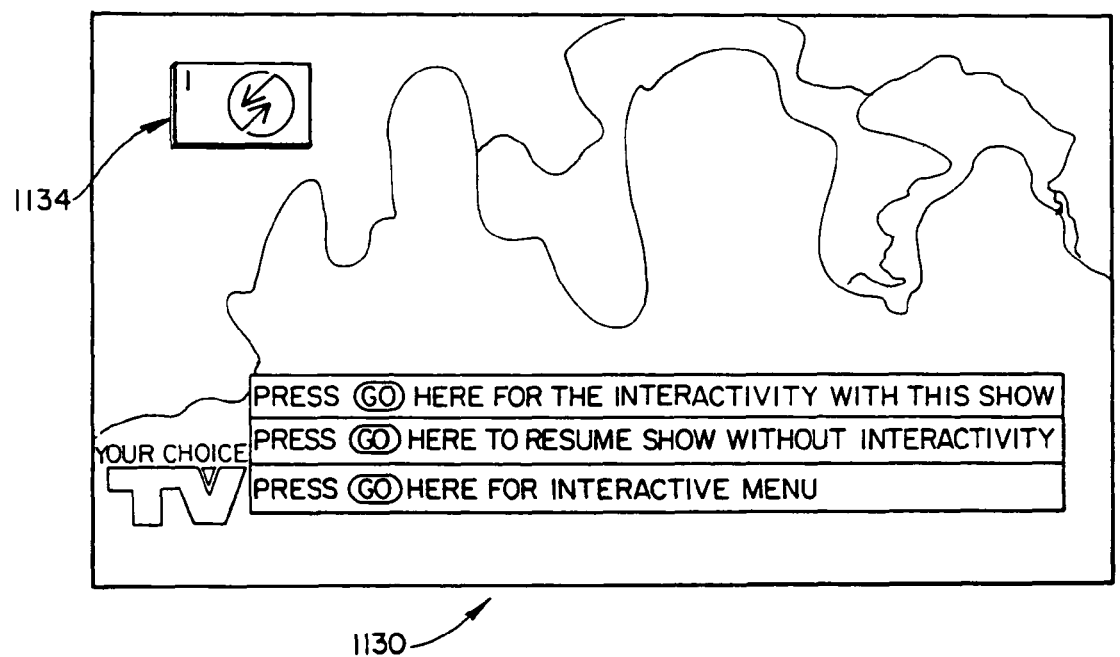
FIGS. 14a and 14b are drawings of submenus for interactive television services using hardware upgrade Level A.
Figure 14B:
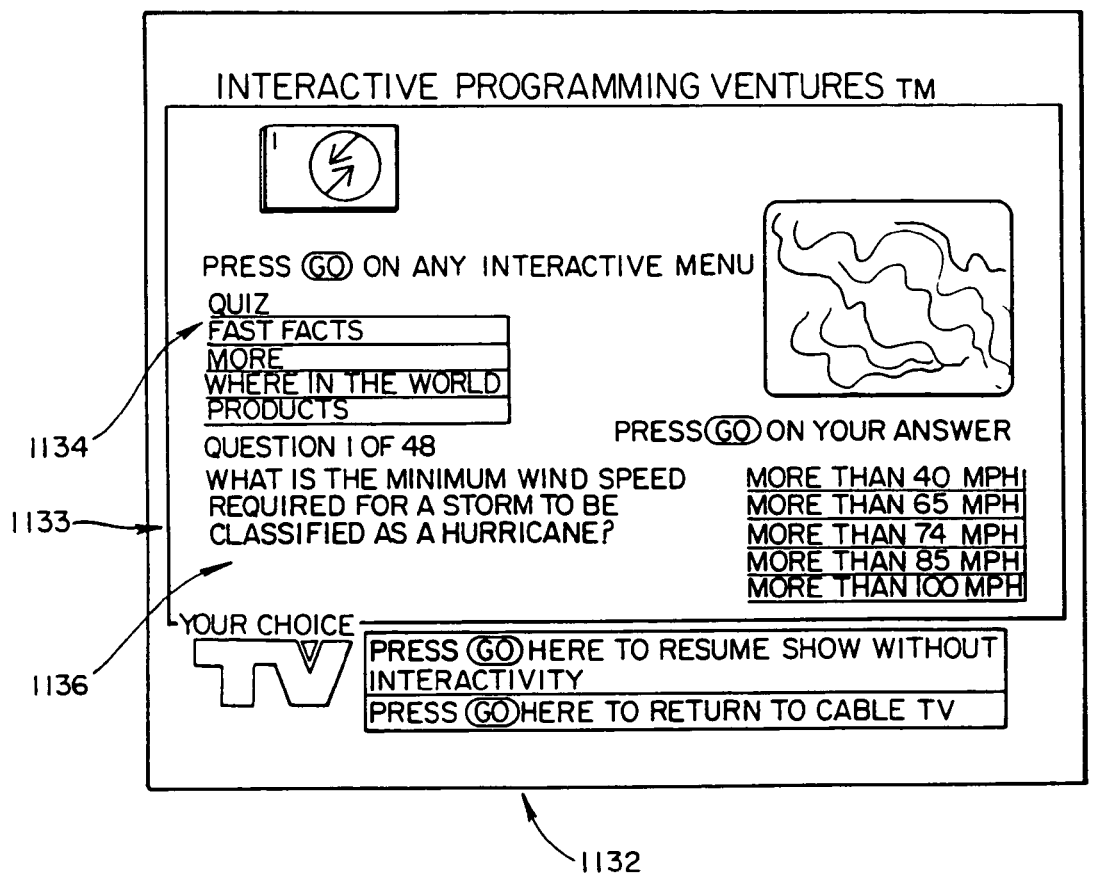

FIGS. 14*a* and 14*b* show menus (1130 and 1132, respectively) that are available using the interactive Level A services. Referring to FIG. 14*a*, when interactive Levels A services are available for a television program, the system will display an interactive logo 1134 consisting of the letter "I" and two arrows with semicircular tails. In the preferred embodiment, the set top terminal 220 will place the interactive logo on the television screen as an overlay menu. In the preferred embodiment, the set top terminal 220 will detect that there is data or information available about a television program which can be displayed to a subscriber using the interactive service. When the set top terminal 220 senses that there is interactive information available, it will generate the interactive logo overlay menu 1134 and place it on the television screen. For example, the set top terminal 220 will detect that information on a television program is being sent in the vertical blanking interval (VBI) and generate an interactive logo overlay menu 1134 which will appear on the subscriber's television screen for approximately fifteen seconds during each ten minute interval of programming. Similarly, the set top terminal 220 can sense that the programming has closed caption information available and place a closed caption logo on the screen.

Referring to FIG. 14*b*, when the subscriber sees the interactive logo 1134 on the television screen, the subscriber is made aware of the fact that interactive services are available in conjunction with his television program. If the subscriber presses the interactive remote control button, another overlay menu 1133 will be generated by the set top terminal 220 and placed on the screen. This overlay menu 1133 is shown in FIG. 14*b* being overlayed on an interactive television program. From this menu 1133, the subscriber may select a variety of different types of textual interactivity with the current television program, as at 1134, including quizzes, fast facts, more info, where in the world, products, etc. At any time during the interactive submenus, the user may return to the television program without interactive features.

Another submenu 1136 gives additional information related to the television program to the viewer in textual form in the lower half of the screen. In FIG. 14*b*, the submenu 1136 shows the available interactive options for the subcategory "quiz." In this interactive subcategory, the user is presented with questions and a series of possible answers. If the subscriber desires, the subscriber selects one of the answers to the quiz question. After the selection, the set top terminal 220 sequences to another menu. The set top terminal 220 sequences to the interactive quiz answers submenu which informs the subscriber whether the correct answer was or was not chosen. Subsequently, another submenu would show correctly or incorrectly answered quiz question.

Figure 15A:
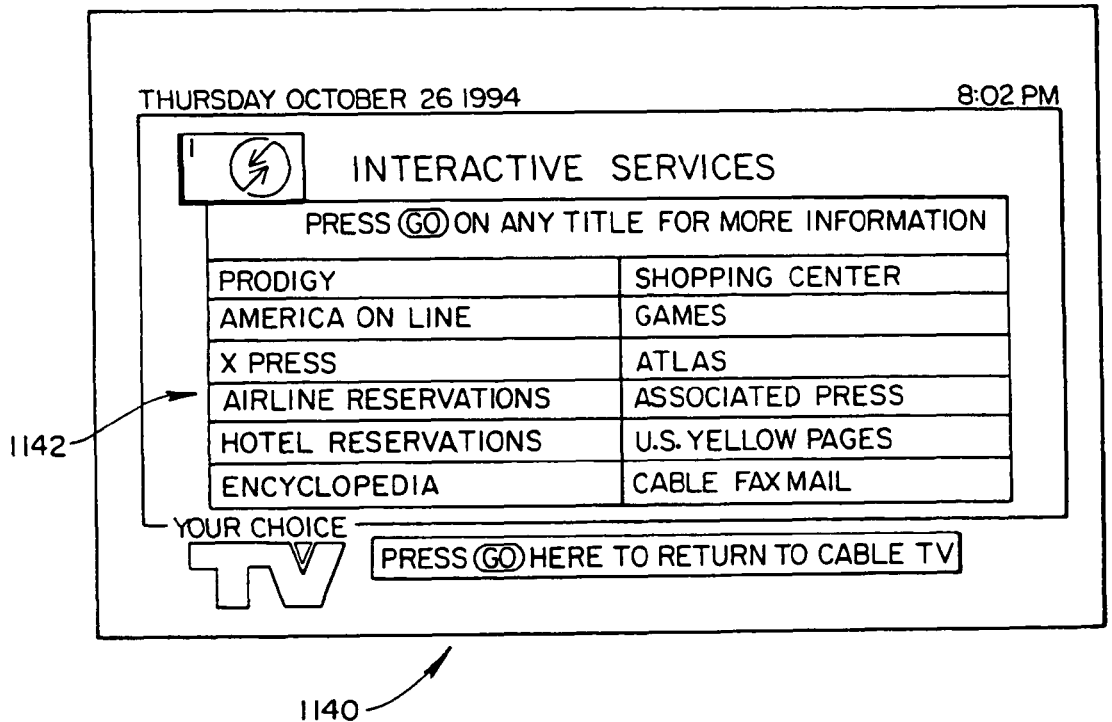

FIG. 15*a* is an example of a submenu for Level B interactive services. From this menu screen 1141, any of a number of on-line data services could be accessed. One service, the airline reservations selection 1142, has been chosen by the subscriber on this menu.

Figure 15B:

In selecting airline reservations, the subscriber encounters a sequence of menus as for any on-line data service. Referring to FIG. 15*b*, the subscriber is typically shown a submenu, such as submenu 1144, for the data service offering various options. In each of these submenus related to a data service, the subscriber is able to exit, returning to the home menu 1010 or regular cable TV.

FIG. 15*b*, the airline information and reservation submenu 1144, allows a subscriber to view six available flights. A subscriber may select one of the flights to check on its availability. Another similar submenu allows a subscriber to enter the month, day and year for the availability date desired. In this submenu, the subscriber is offered the option of correcting any errors in the entered information.

FIG. 15*c* is another airline submenu 1150 that allows a subscriber to view remaining seats available on a flight, enabling the selection of a seat assignment. This interactive submenu 1150 is an example of how information may be graphically shown to a subscriber using a portion of the menu and different coloring schemes. In this interactive menu, the lower half of the screen 1152 shows the passenger compartment of an airplane with all the seat locations graphically represented by square blocks. By coloring the available seat locations in blue and the unavailable seat locations in a different color, the menu can present a great deal of information in a limited amount of space. This graphic presentation of information for the interactive on-line data services is an important method of visually displaying large amounts of information to the subscriber.

Figure 15D:
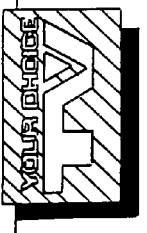

Referring to FIG. 15*d*, another submenu 1156 allows the subscriber to choose a one-way or round-trip ticket, to confirm reservations and to charge an airline ticket by credit card, choosing the appropriate strip menu on the lower part of the screen. In this particular menu 1156, the subscriber is charging a round-trip plane ticket on a credit card. The subscriber simply needs to enter the credit card number, expiration date, and credit card type to charge an airline ticket. Other submenus may process the subscriber's credit card charge for the airline ticket, confirm the subscriber's airline ticket purchase, and pass this information to the location where the ticket is printed.

Using the methods and hardware described, a variety of interactive services are possible. Those skilled in the art will recognize that such interactive services may be accommodated by the preferred set top terminal 220.

The terms and descriptions used herein are set forth by way of illustration only and are not meant as limitations. Those skilled in the art will recognize that numerous variations are possible within the spirit and scope of the invention as defined in the following claims and their equivalents.

What we claim is:

1. A hardware upgrade for a set top terminal for use with a television program delivery system with menu selection of programs, the set top terminal having a microprocessor and microprocessor instructions for prompting generation of menus, the hardware upgrade comprising:
    an upgrade interface configured for insertion within an expansion card interface slot of the set top terminal for providing access to a set top terminal microprocessor bus coupled to the set top terminal microprocessor and providing data to the set top terminal microprocessor via the set top terminal microprocessor bus;
    a communications port to provide communication between the hardware upgrade and a headend; and
    a hardware upgrade microprocessor, coupled to the upgrade interface, the hardware upgrade microprocessor configured for communicating directly with the set top terminal microprocessor through the set top terminal microprocessor bus via the upgrade interface;
    wherein the hardware upgrade microprocessor provides enhanced functions to the set top terminal microprocessor through communication with the set top terminal microprocessor using the upgrade interface coupled to the set top terminal microprocessor bus according to interactive input received from a subscriber, generate responses based on the received interactive input and provide the generated responses to the microprocessor of the set top terminal, the hardware upgrade microprocessor configured to communicate directly with a headend via the communications port to receive upgrade data to provide the enhanced functions to the set top microprocessor in response to the interactive input received from the subscriber.

2. The hardware upgrade of claim 1 further comprising memory, coupled to the hardware upgrade microprocessor, for storing data therein and processing circuitry, coupled to the hardware upgrade microprocessor, wherein the hardware upgrade microprocessor accesses the memory and controls the processing circuitry to cause the processing circuitry to provide the enhanced functions to the set top terminal microprocessor via the upgrade interface and wherein the processing circuitry includes a hardware upgrade modem for providing communication between the hardware upgrade and one or more headends.

3. The hardware upgrade of claim 2, wherein the processing circuitry includes a modulator and demodulator to add a data modulation and demodulation function to the set top terminal microprocessor such that data may be retrieved by the modem of the hardware upgrade from the one or more headends and stored in the memory of the hardware upgrade.

4. The hardware upgrade of claim 2, wherein the modem of the hardware upgrade retrieves information from an interactive service by accessing an on-line database enabling the set top terminal microprocessor to engage in transactions using two-way communications over the modem of the hardware upgrade with the interactive service via submenus provided by the hardware upgrade microprocessor as an overlay to a program displayed by the set top terminal microprocessor.

5. The hardware upgrade of claim 1, wherein the upgrade interface is a card insertable interface enabling insertion into a card receiving slot of the set top terminal.

6. The hardware upgrade of claim 2, wherein the modem of the hardware upgrade is capable of communicating with the interactive service outside of the television program delivery system.

7. The hardware upgrade of claim 6, wherein the interactive service is selected from a group consisting of home shopping, airline reservations, news, financial information, classified advertisements, home banking, and interactive teletext.

8. A set top terminal for use with a television program delivery system with menu selection of programs, the set top terminal having a microprocessor and microprocessor instructions for prompting generation of menus and comprising:
    a receiver adapted to receive programs; and
    a first hardware upgrade comprising:
        a communications port to provide communication between the hardware upgrade and a headend;
        an upgrade interface configured for insertion within an expansion card interface slot of the set top terminal for providing access to a set top terminal microprocessor bus coupled to the set top terminal microprocessor and providing data to the set top terminal microprocessor via the set top terminal microprocessor bus; and
        a hardware upgrade microprocessor, coupled to the upgrade interface, the hardware upgrade microprocessor configured for communicating directly with the set top terminal microprocessor through the set top terminal microprocessor bus via the upgrade interface;
    wherein the hardware upgrade microprocessor provides enhanced functions to the set top terminal microprocessor through communication with the set top terminal microprocessor using the upgrade interface coupled to the set top terminal microprocessor bus according to interactive input received from a subscriber, generate responses based on the received interactive input and provide the generated responses to the microprocessor of the set top terminal, the hardware upgrade microprocessor configured to communicate directly with a headend via the communications port to receive upgrade data to provide the enhanced functions to the set top microprocessor in response to the interactive input received from the subscriber.

9. The set top terminal of claim 8 further comprising memory, coupled to the hardware upgrade microprocessor, for storing data therein and processing circuitry, coupled to the hardware upgrade microprocessor, wherein the hardware upgrade microprocessor accesses the memory and controls the processing circuitry to cause the processing circuitry to provide the enhanced functions to the set top terminal microprocessor via the upgrade interface and wherein the processing circuitry includes a hardware upgrade modem for providing communication between the hardware upgrade and one or more headends.

10. The set top terminal of claim 9, wherein the processing circuitry includes a modulator and demodulator to add a data modulation and demodulation function to the set top terminal microprocessor such that data may be retrieved by the modem of the hardware upgrade from the one or more headends and stored in the memory of the hardware upgrade.

11. The set top terminal of claim 9, wherein the modem of the hardware upgrade retrieves information from an interactive service by accessing an on-line database enabling the set top terminal microprocessor to engage in transactions using two-way communications over the modem of the hardware upgrade with the interactive service via submenus provided by the hardware upgrade microprocessor as an overlay to a program displayed by the set top terminal microprocessor.

12. The set top terminal of claim 8, wherein the upgrade interface is a card insertable interface enabling insertion into a card receiving slot of the set top terminal.

13. The set top terminal of claim 9, wherein the modem of the hardware upgrade is capable of communicating with the interactive service outside of the television program delivery system.

14. The set top terminal of claim 13, wherein the interactive service is selected from a group consisting of home shopping, airline reservations, news, financial information, classified advertisements, home banking, and interactive teletext.

15. The set top terminal of claim 8 further comprising:
one or more additional hardware upgrades connected to the terminal.

16. The set top terminal of claim 15, wherein at least one of the one or more additional hardware upgrades is selected from a group consisting of an audio program reception hardware upgrade, an interactive hardware upgrade that receives interactive subscriber input and produces interactive output, and a storage hardware upgrade.

17. A system comprising:
a television program delivery system adapted to deliver television program signals; and
a set top terminal having a microprocessor and microprocessor instructions for prompting generation of menus and comprising:
a receiver adapted to receive at least some of the television program signals; and
a hardware upgrade comprising:
a hardware communications port to provide communication between the hardware upgrade and a headend;
an upgrade interface configured for insertion within an expansion card interface slot of the set top terminal for providing access to a set top terminal microprocessor bus coupled to the set top terminal microprocessor and providing data to the set top terminal microprocessor via the set top terminal microprocessor bus; and
a hardware upgrade microprocessor, coupled to the upgrade interface, the hardware upgrade microprocessor configured for communicating directly with the set top terminal microprocessor through the set top terminal microprocessor bus via the upgrade interface;
wherein the hardware upgrade microprocessor provides enhanced functions to the set top terminal microprocessor through communication with the set top terminal microprocessor using the upgrade interface coupled to the set top terminal microprocessor bus according to interactive input received from a subscriber, generate responses based on the received interactive input and provide the generated responses to the microprocessor of the set top terminal, the hardware upgrade microprocessor configured to communicate directly with a headend via the hardware communications port to receive upgrade data to provide the enhanced functions to the set top terminal microprocessor in response to the interactive input received from the subscriber.

18. The system of claim 17 further comprising memory, coupled to the hardware upgrade microprocessor, for storing data therein and processing circuitry, coupled to the hardware upgrade microprocessor, wherein the hardware upgrade microprocessor accesses the memory and controls the processing circuitry to cause the processing circuitry to provide the enhanced functions to the set top terminal microprocessor via the upgrade interface and wherein the processing circuitry includes a hardware upgrade modem for providing communication between the hardware upgrade and one or more headends.

19. A method for delivering television programs through a television program delivery system with menu selection of programs, comprising:
receiving subscriber input at a hardware upgrade card from a set top terminal;
providing a communications port to provide communication between the hardware upgrade and a headend;
providing an upgrade interface to the hardware upgrade card, the upgrade interface being configured for insertion within an expansion card interface slot of the set top terminal for providing access to a set top terminal microprocessor bus coupled to the set top terminal microprocessor and providing data to the set top terminal microprocessor via the set top terminal microprocessor bus; and
providing a hardware upgrade microprocessor, coupled to the upgrade interface, the hardware upgrade microprocessor configured for communicating directly with the set top terminal microprocessor through the set top terminal microprocessor bus via the upgrade interface,
wherein the hardware upgrade microprocessor provides enhanced functions to the set top terminal microprocessor through communication with the set top terminal microprocessor using the upgrade interface coupled to the set top terminal microprocessor bus according to interactive input received from a subscriber, generate responses based on the received interactive input and provide the generated responses to the set top terminal microprocessor, the hardware upgrade microprocessor configured to communicate directly with a headend via the communications port to receive upgrade data to provide the enhanced functions to the set top microprocessor in response to the interactive input received from the subscriber.

* * * * *

UNITED STATES PATENT AND TRADEMARK OFFICE
CERTIFICATE OF CORRECTION

| | | |
|---|---|---|
| PATENT NO. | : 8,347,345 B1 | Page 1 of 1 |
| APPLICATION NO. | : 09/396429 | |
| DATED | : January 1, 2013 | |
| INVENTOR(S) | : Hendricks et al. | |

It is certified that error appears in the above-identified patent and that said Letters Patent is hereby corrected as shown below:

In the Specification: Col. 21, lines 26-27: "(3) a Level interactive unit" should read --(3) a Level C interactive unit--

In the Claims: Col. 30, lines 55-56, claim 19: "set top microprocessor" should read --set top terminal microprocessor--

Signed and Sealed this
Twenty-third Day of July, 2013

Teresa Stanek Rea
*Acting Director of the United States Patent and Trademark Office*